(12) United States Patent  
Lin et al.

(10) Patent No.: US 10,678,831 B2  
(45) Date of Patent: Jun. 9, 2020

(54) PAGE JOURNEY DETERMINATION FROM FINGERPRINT INFORMATION IN WEB EVENT JOURNALS

(71) Applicant: CA, Inc., New York, NY (US)

(72) Inventors: Cui Lin, Sunnyvale, CA (US); Erhan Giral, Saratoga, CA (US); Corey Cohen, Matawan, NJ (US)

(73) Assignee: CA TECHNOLOGIES, INC., New York, NY (US)

( * ) Notice: Subject to any disclaimer, the term of this patent is extended or adjusted under 35 U.S.C. 154(b) by 301 days.

(21) Appl. No.: 15/693,447

(22) Filed: Aug. 31, 2017

(65) Prior Publication Data

US 2019/0065588 A1 Feb. 28, 2019

(51) Int. Cl.
*G06F 16/33* (2019.01)
*G06F 16/35* (2019.01)
*G06Q 20/40* (2012.01)
*G06Q 30/06* (2012.01)

(52) U.S. Cl.
CPC ........ *G06F 16/353* (2019.01); *G06F 16/3344* (2019.01); *G06F 2216/03* (2013.01); *G06Q 20/40145* (2013.01); *G06Q 30/0631* (2013.01)

(58) Field of Classification Search
CPC ............... G06F 16/353; G06F 16/3344; G06F 2216/03; G06Q 20/40145; G06Q 30/0631
See application file for complete search history.

(56) References Cited

U.S. PATENT DOCUMENTS 6,243,091 B1 * 6/2001 Berstis ................ G06F 16/9562  
    715/839  
6,310,630 B1 * 10/2001 Kulkarni ............... G06F 16/955  
    715/776  
6,633,316 B1 * 10/2003 Maddalozzo, Jr. ... G06F 16/957  
    715/854

(Continued)

OTHER PUBLICATIONS

Analyze your data with the Users Flow: See specific examples of how the Users Flow report can give you insights into your data, Analytcs Help, https://support.google.com/analytics/answer/1713056?hl=en, 4 pages. [Retrieved May 9, 2017].

(Continued)

*Primary Examiner* — Jorge A Casanova
(74) *Attorney, Agent, or Firm* — Shook, Hardy & Bacon L.L.P.

(57) ABSTRACT

Large amounts of data from user interactions with web resources is available as data logs. Analysis may be performed to process the data log in order to determine the characteristics of the user interactions. Data log analysis may include identifying page states, which may be sets of frequent attributes and values that occur together in a session. The data log analysis may also include generating semantic labels of page states, which may describe the function of pages corresponding to different page states. Text mining models may be used to determine the semantic labels. Analysis may also include aggregating sets of page paths to create page journeys. These page journeys may be aggregated over all users, all user sessions, or other subsets of the clickstream. In some embodiments, comparing page journeys may provide recommendations for potential methods to improve the site and enhance user experiences.

18 Claims, 14 Drawing Sheets

(56) References Cited

U.S. PATENT DOCUMENTS

| | | | | |
|---|---|---|---|---|
| 6,667,751 | B1* | 12/2003 | Wynn | G06F 16/955 715/833 |
| 6,996,782 | B2* | 2/2006 | Parker | G06F 16/58 715/764 |
| 7,209,906 | B2* | 4/2007 | Goodwin | G06N 5/00 706/14 |
| 7,225,407 | B2* | 5/2007 | Sommerer | G06F 16/957 715/738 |
| 7,251,775 | B1* | 7/2007 | Astala | H04L 29/06 715/205 |
| 7,613,752 | B2* | 11/2009 | Prahlad | G06F 16/24575 |
| 8,346,709 | B2* | 1/2013 | Silverman | G06Q 30/02 705/14.49 |
| 8,566,696 | B1* | 10/2013 | Hamon | G06F 16/957 715/205 |
| 8,655,819 | B1* | 2/2014 | Burkard | G06N 5/048 706/45 |
| 8,744,988 | B1* | 6/2014 | Hamon | G06F 17/2235 706/45 |
| 9,582,592 | B2* | 2/2017 | Mason | G06F 17/2247 |
| 2003/0004995 | A1* | 1/2003 | Novaes | G06F 16/904 715/272 |
| 2004/0003351 | A1* | 1/2004 | Sommerer | G06F 16/955 715/251 |
| 2005/0132018 | A1* | 6/2005 | Milic-Frayling | G06F 16/955 709/213 |
| 2006/0041562 | A1* | 2/2006 | Paczkowski | G06F 16/9562 |
| 2006/0224997 | A1* | 10/2006 | Wong | G06F 16/9562 715/838 |
| 2007/0124693 | A1* | 5/2007 | Dominowska | G06F 16/9535 715/772 |
| 2007/0208729 | A1* | 9/2007 | Martino | G06Q 30/0255 |
| 2008/0046218 | A1* | 2/2008 | Dontcheva | G06F 11/32 702/186 |
| 2012/0259851 | A1* | 10/2012 | Jia | G06Q 30/0242 707/737 |
| 2012/0259854 | A1* | 10/2012 | Hsiao | G06F 16/958 707/739 |
| 2013/0055137 | A1* | 2/2013 | Choc | G06Q 30/02 715/772 |
| 2014/0095413 | A1* | 4/2014 | Kirillov | H04N 21/25883 706/12 |
| 2014/0164385 | A1* | 6/2014 | Liu | G06F 16/337 707/740 |
| 2015/0067804 | A1* | 3/2015 | Maxwell | H04L 63/083 726/7 |
| 2015/0156232 | A1* | 6/2015 | Sharma | G06F 16/282 715/753 |
| 2015/0163311 | A1* | 6/2015 | Heath | G06Q 30/0201 709/204 |
| 2017/0161749 | A1* | 6/2017 | Shaikh | G06Q 20/4016 |

OTHER PUBLICATIONS

Adam Greco, "Segment Pathing", Demystified, Aug. 31, 2009, http://analyticsdemstified.com/adobe-analytics/segment-pathing/, 9 pages.

Run a Page Flow report, Reports and Analytics Help, Adobe Marketing Cloud Help, https://marketing.adobe.com/resources/help/en_US/sc/user/t_reports_page_flow.html, 3 pages. [Retrieved May 9, 2017].

Clickstream or clickpath analysis, Opentracker, http://www.opentracker.net/article/clickstream-or-clickpath-analysis, updated: Apr. 15, 2013, 3 pages.

Clickstream Data Feeds Help, Adobe Systems Inc., 2017, https://marketing.adobe.com/resources/help/en_US/sc/clickstream/, 1 page. [Retrieved Aug. 29, 2017].

* cited by examiner

Data Log 200

Component #819193 response headerstatus=304
 ParamHeader Resp Date = Wed, 28 Oct 2009 14:02:51 GMT.
 ParamHeader Resp Content-Length = 0.
Component #819193 response body
Component #819194 requestwidgetco/cs/finprd/cache/
PT_SAVEWARNINGSCRIPT_1.js client=[10.60.16.203]:3641
server=[10.10.1.231]:8200
 ParamUrl   Req  Port = 8200.
 ParamUrl   Req  Path = /cs/finprd/cache/PT_SAVEWARNINGSCRIPT_1.js.
 ParamHTTP  Req  Accept = */*.
 ParamHTTP  Req  Referer = http://widgetco.com:8200/psp/finprd/
EMPLOYEE/ERP/h/?tab=DEFAULT.
 ParamHTTP  Req  Accept-Language = en-us.  ← attribute-value pair 210
 ParamHTTP  Req  UA-CPU = x86.
 ParamHTTP  Req  Accept-Encoding = gzip, deflate.
 ParamHTTP  Req  If-Modified-Since = Sun, 16 Aug 2009 16:11:44 GMT.
 ParamHTTP  Req  User-Agent = Mozilla/4.0 (compatible; MSIE 7.0;
Windows NT 5.2; .NET CLR 1.1.4322; .NET CLR 2.0.50727; .NET CLR
3.0.04506.30; .NET CLR 3.0.04506.648; InfoPath.2; .NET CLR 3.0.4506.2152;
.NET CLR 3.5.30729).
 ParamHTTP  Req  Host = widgetco.com:8200.
 ParamUrl   Req  Host = widgetco.
 ParamHTTP  Req  Connection = Keep-Alive.
 ParamHTTP  Req  Cookie = SignOnDefault=GCONDON; SOM-VCS-
PSFAPP4-8200-PORTAL-
PSJSESSIONID=KyNWSVFGQtzwjpJ9tHpsKFk565jJsJnl!-107236473;
ExpirePage=http://widgetco.com:8200/psp/finprd/; PS_LOGINLIST=http://
widgetco.com:8200/finprd;
PS_TOKENEXPIRE=28_Oct_2009_14:02:51_GMT;
PS_TOKEN=ogAAAAQDAgEBAAAAvAIAAAAAAAsAAAABABTaGRyAk4Ab
wg4AC4AMQAwABSuzfma9WetLNBE9QeuC1vXdoVqLGlAAAAFAFNkYXRh
VnicHYlBCoAwEAOnVTz6k0otLepZa29a0LtP8IM+zmUTmCTkBdrGGiP5WVR
9YeXkYFN2WVDoKxc7Nw+ZSgx48YJjlHQEZqGXNZCYhFG7V0d5E/
yQwwus;

FIG. 2

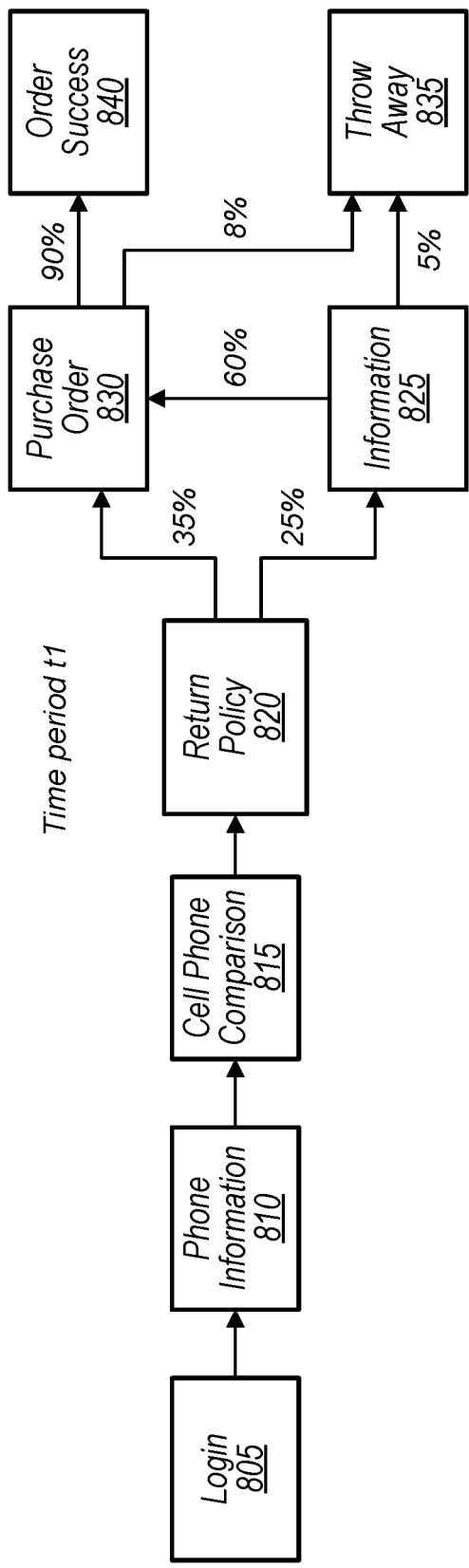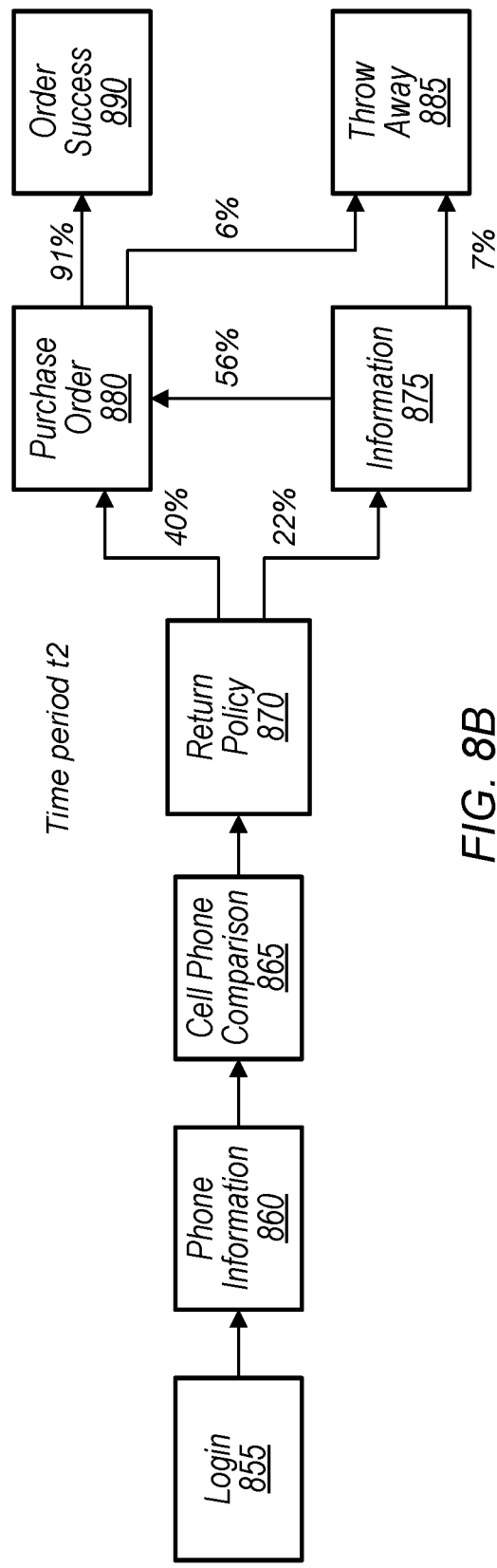

PAGE JOURNEY DETERMINATION FROM FINGERPRINT INFORMATION IN WEB EVENT JOURNALS

BACKGROUND

Technical Field

This disclosure relates generally to information technology and more specifically to analysis of user interaction data.

Description of the Related Art

User interactions with a website may be recorded in one or more files comprising a data log. Analysis of data in the data log may yield useful information regarding the manner in which users interact with the website. Accordingly, a data log for that website may be referred to as a "web event journal." For example, this analysis may determine what pages within the website particular users have visited. Such information may be used to improve the user experience for future website visits, for example.

Different websites (or indeed different applications within a particular website) are commonly developed with different techniques, including varying programming languages, style sheets, and attribute definitions. These variances cause differences in the format and organization of the corresponding data logs. Thus, there is no universal manner in which website data logs are organized.

SUMMARY

Various websites generate large amounts of data that indicate the behavior of users of those websites. In many cases, the data logs for these websites do not provide identification of page flows or state transitions of the applications that may be accessed via the web resources. Analysis may be performed to process the clickstreams in order to determine the characteristics of the user interactions, and may provide information relating to the page journey of users or aggregated users of a website.

In some embodiments, the data logs may be analyzed according to instructions on a computer system. The data log analyzer may receive data logs as input. An output of a data log analyzer may be page journey information. Page journey information may include descriptions of which attributes of the data log correspond to specific web resources, the sequence of web resources accessed by users, labels for specific sets of attributes or web resources, or various other components, relations, etc. of the data log.

Data log analysis may include identifying page states. In some embodiments, a page state is a set of frequent attributes and values that occur together in a session. An identified page state may include multiple different attributes, and each attribute of the page state may include multiple values. For example, a page state may include attribute/value pairs A1V1, A2V2, A3V3, A3V4, etc., where A1, A2, etc. represent unique attributes, and V1, V2, etc. represent unique values.

The data log analysis may also include generating semantic labels of page states, which may describe the function of pages corresponding to different page states. In some embodiments, the attribute/value pairs associated with a page state are processed in order to determine a label. The text associated with a page state may be tokenized in order to be used for text mining models. Generating the labels may include using a training data set of page states where the labels have been manually defined.

Analysis may also include aggregating sets of page paths to create page journeys. These page journeys may be aggregated over all users, all user sessions, various subsets of users or user sessions, etc. In some embodiments, comparing page journeys may provide recommendations for potential methods to improve the site and enhance user experiences. Page journey information may be used to reduce user wait time to or to remove redundant pages from page paths. In some embodiments, page journey information may be used to modify, in real time, a user experience of a user interacting with the set of web resources by changing user options at a particular page state.

BRIEF DESCRIPTION OF THE DRAWINGS

FIG. 2 is a block diagram illustrating a data log, according to some embodiments.

FIG. 8A is a diagram illustrating a page journey at time t1, according to some embodiments.

FIG. 8B is a diagram illustrating a page journey at time t2, according to some embodiments.

Figure 1:
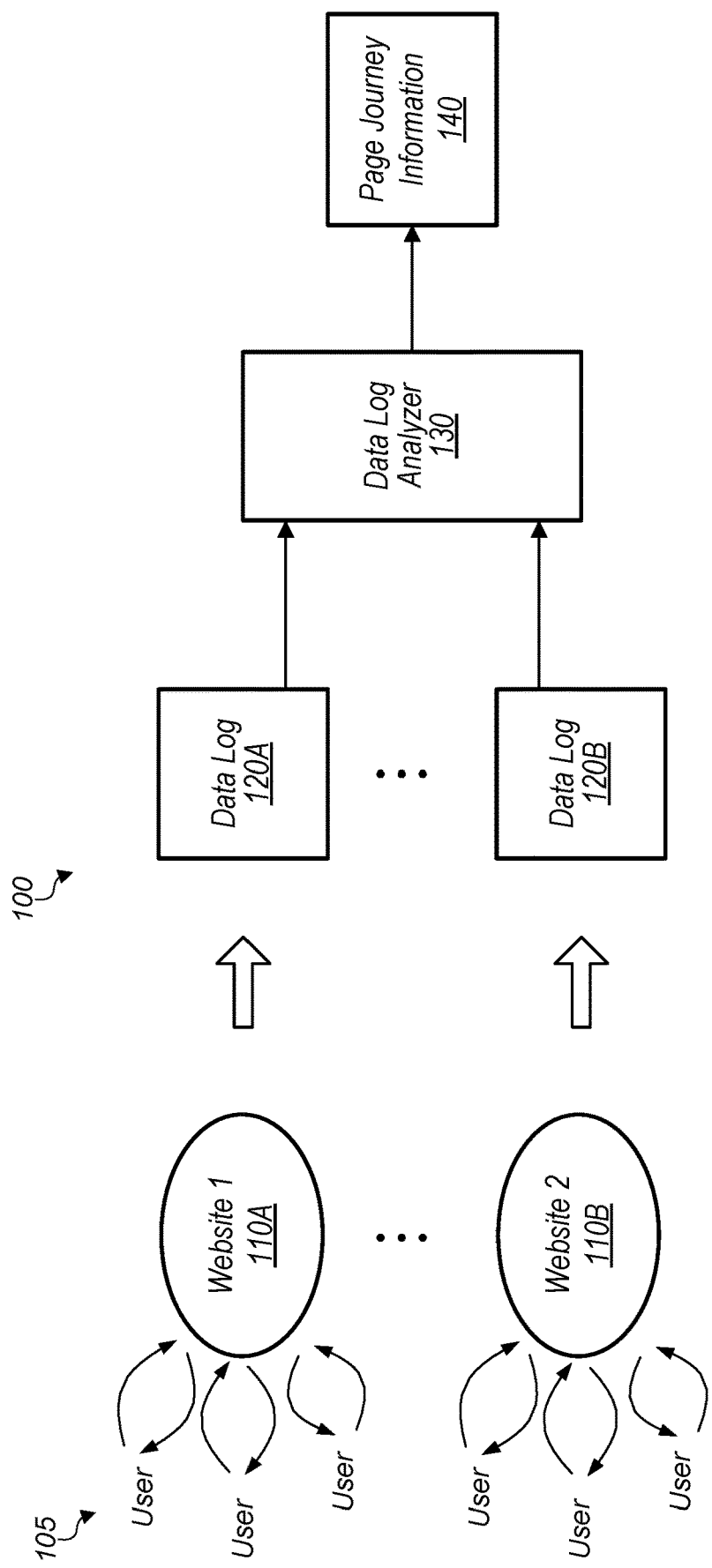
FIG. 1 is a block diagram illustrating a process for analyzing data corresponding to user interactions with web resources, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure, including the appended claims. Particular features, structures, or characteristics may be combined in any suitable manner consistent with this disclosure.

It is to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to generate a hash value" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

As noted, data logs may include large amounts of data indicative of interactions between users and a set of web resources that are at least partially interlinked (e.g., a particular website). It is desirable to be able to analyze these data logs (which may be referred to as "clickstream data" in some cases) to determine "page journey information"—that is, information about sequences of pages or web resources that website users interact with. Page journey information may indicate, for example, the relative frequency with which website users travel from page A to page B as opposed to page A to page C.

FIG. 1 illustrates a block diagram of a system 100 for generating page journey information. Consider a plurality of users 105 that interact with websites 110A and 110B. These websites have corresponding data logs 120A and 120B, which are processed by data log analyzer module 130 to generate page journey information 140.

Each of websites 110A and 110B represents a set of web resources that are at least partially interlinked with one another. The data corresponding to interactions of users 105 with websites 110A and 110B (for example the URLs that are visited or the amount of time spent viewing a page) are recorded by a computer system in the form of data log 120A, which corresponds to website 110A, and data log 120B, which corresponds to website 110B. Data logs 120A and 120B are files that may be referred to as clickstream data in some instances. Data logs 120A and 120B contain lists of attributes related to a set of web resources and values associated with those attributes. As used herein, an "attribute" refers to a variable or other setting associated with a web resource, where the variable or setting has a value. Collectively, the attribute and its value are referred to as an attribute-value pair. One example of an attribute of a web resource is the language preference of a user; a value paired with this attribute may be English, Chinese, German, etc. In various embodiments, data logs 120A and 120B may take various forms. In some cases, the logs may be text files. In other cases, they may be databases or other forms of organized data. Data logs may be stored in any suitable manner, including a transient medium such as RAM or a more permanent form of storage (e.g., secondary storage).

Data log analyzer module 130, in turn, receives data logs 120A and/or 120B as inputs, as generates page journey information 140 as output. As used herein, a "module" is a structural term that may refer either to hardware that is configured to perform a particular task, or to software instructions stored on or in a non-transitory computer-readable medium that, when executed by one or more processors, perform a particular task. In various embodiments, data log analyzer 130 may process a single data log, multiple data logs, concatenated data logs, data streaming in as it is generated, or other forms of information.

In many cases, from the perspective of data log analyzer module 130, the format of data logs 120A and 120B is not known in advance. Further, different data logs such as 120A and 120B that are supplied to module 130 may have different formats. For example, data log 120A may have different names for attributes than data log 120B or the definitions for similar attributes may be different between data logs 120A and 120B. Also, in some embodiments, there may be attributes in data log 120A that do not appear in data log 120B or attributes in data log 120B that do not appear in data log 120A.

In some embodiments, the difference in format of data logs 120A and 120B is based at least in part on websites 110A and 110B being programmed using different programming languages. Other examples of differences between the web resources include different style sheets, different application purposes, or other functional or aesthetic differences between the web resources. Thus, even if websites 110A and 110B each have a similar web resource (e.g., an e-commerce shopping cart), the format in which data logs 120A and 120B represent this resource may differ.

Data log analyzer module 130 receives data logs 120A and 120B as inputs. Data log analyzer 130 processes this data to generate page journey information 140. Page journey information may include descriptions of which attributes of the data log correspond to specific web resources, the sequence of web resources accessed by users 105, labels for specific sets of attributes or web resources, or various other components, relations, etc. of the data log. Page journey information may also include graphical representations of the data log, relations between elements of the data log, or other information that may be presented graphically. In some embodiments, data log analyzer 130 may also generate other types of outputs besides page journey information, including but not limited to information related to the functioning of the analyzer, information relating to the processed data logs, graphical user interfaces, and graphical depictions of the data log.

Analysis of data logs may then proceed in various manners after reading in unknown attributes and values. For example, a frequency analysis may be conducted in which the frequency of various items in the data log may be determined—for example, frequency of attributes, values, and/or attribute-value pairs. This frequency analysis may then be used to classify the identified frequencies into various categories. In some embodiments, classifications may be determined according to certain thresholds. For example, in some cases, attribute-value pairs that occur more than 10 times but less than 100 times may be assigned a first classification, while attribute-value pairs that occur more than 100 times but less than 200 times may be another classification, etc.

As recognized by the present inventors, frequency classification may be useful because attributes and attribute-value pairs that occur at similar frequencies may often be related. In some embodiments, attribute-value pairs that relate to implementation details of a website may occur very infrequently, while attribute-value pairs that relate to users of a website may occur more commonly. For example, an attribute-value pair that occurs only once may be related to security of a website, e.g. a security key, whereas attribute-value pairs that occur much more frequently may be related to characteristics of users, e.g. a preferred language.

Based on the determined frequency of occurrence, attributes and attribute value pairs may be grouped into "page states." As used herein, a "page state" refers to a set of attributes and values that occur together during a particular user session. Note that while a page state can refer to a single URL, the concept is broader. For example, two different page states may correspond to different dynamic aspects of a single URL (e.g., that alter the appearance or functionality without changing the URL. Accordingly, a page state relates the state of the web resources comprising a website in a particular instance.

Thus, attribute-value pairs with the same classifications that commonly occur together may be related to similar portions of a website. For example, an attribute-value pair corresponding to the number of items in a shopping cart may occur commonly, and an attribute-value pair corresponding to a checkout button may also occur commonly, and these two pairs may always occur together. These attributes may thus be part of a page state. By grouping multiple sets of attributes, values, and/or attribute-value pairs in this manner, multiple page states may be identified.

Data logs include information not only from multiple users, but also from the same users at different points in time. Accordingly, it is useful to group page states into "user sessions." Data within a "user session" all corresponds to a particular user, and all satisfies some time-based criteria. For example, one user session may include the set of page states associated with a particular user during a substantially continuous interaction with a portion of a website over some time frame.

User sessions may also be identified based on the frequency of occurrence of attributes and attribute-value pairs. Attribute-value pairs with the same classifications that commonly occur together may be related to the same user sessions. For example, attributes related to user characteristics may appear in the data log for each action a user takes, and so would occur commonly and at substantially the same times. Specific sets of attribute-value pairs may occur only when a particular user is visiting a website, and so may identify a user. In some embodiments, when a user session, e.g. user session A, is identified, page states comprised of attributes and values associated with the identified user session may then be associated with the identified user session. For example, if page state A has been identified, instances of page state A that occur at substantially the same time as attributes and values for user session A may be associated with user session A.

Even once a page state is identified, and possibly associated with a user session, the intended purpose or function of a page state may not be immediately clear from the sets of attributes and attribute values that identify it. In other words, the page state may not be intelligible to a human user. In order to derive useful information from page states, a "semantic meaning" of the associated attributes and attribute values that comprise the page state may be identified. The semantic meaning may correspond to an intended use or function of a page state, and may be represented by a label or description associated with a page state. For example, a particular page state may be determined to correspond to a shopping cart. As such, a "semantic label" of "Shopping Cart" might be assigned to that page state.

In some embodiments, semantic meaning and labels may be determined by performing text analysis of text with attributes of a page state (e.g., by running text mining models). Sets of page states that have been previously identified and assigned meanings may provide a useful set of training data for a text mining model. For example, online shopping checkout pages may be determined to be associated with text such as "buy" or "pay", so a text mining model may determine that as-yet unidentified page states that have values which include "buy" or "pay" may be semantically labelled as checkout pages.

Once page states are identified, they may be further associated into page paths. A page path identifies an ordered set of page states that a user encounters while using a website. Page paths may be based on the order in which the attributes associated with page states appear in a data log, or on the time associated with attributes, or other means of ordering page states.

Page paths for different users may then be aggregated into page journey information. Many users may have page paths that are at least partially the same. In some embodiments, rules may be used to determine page journey information; for example, a rule may determine that sets of page paths which include page state A and B and end with page state D may be aggregated. Page journey information may include information related to the percentage of users likely to traverse a specific path. For example, some page paths may proceed from page state B to page state C, while others may proceed from page state B to page state D; in some embodiments, the page journey may indicate how many users go to page state D, or the likelihood of a user going to page state D. This page journey information may be recorded or displayed and used for various purposes.

Data log analyzer module 130 thus identifies and analyzes attributes within a particular data log (e.g., determining relative frequencies of attributes). Module 130 uses this information to make determinations about page states that particular users have visited. This information may be aggregated to determine page journey information about sequences of page states visited by a plurality of users.

Significantly, module 130 may, in some instances, perform these functions for a particular website without a priori knowledge of the format of the data log, meaning that data logs 120A and 120B with different formats can each be processed by module 130 to generate page journey information. Thus module 130 is usable on a data log for an arbitrary website to determine information about user interactions with that website (e.g., page journey information). This paradigm is a more versatile approach to clickstream analysis.

Obtaining page journey information for a particular website has various uses. Maintainers of websites may use page journey information to obtain advantages relating to information about users of the web sites, performance characteristics of the website, or other aspects relating to the operation of web resources. Examples include, but are not limited to: discovering users' purchase patterns, providing insights to guide decisions that may be relevant to websites' design, or decreasing access time by caching or customizing frequently visited pages. Purchase patterns may include a set of products which users may often purchase together, products which users may purchase in succession, or other combinations or types of patterns.

Maintainers of websites may also use page journey information to provide benefits to the users of the websites. Benefits to users that may result from page journey information may include: personalized page journeys, recommendations from real-time clickstreams, or enhanced user experiences that may be more personalized, intelligent, or effective. Personalized page journeys may include presenting a user with a sequence of pages based on previous actions of the user or on preferences exhibited by the user or users with similar page journey histories. Recommendations from real-time clickstreams may include recommendations on media a user may wish to watch, listen to, etc., recommendations on other portions of the websites a user may wish to view, recommendations on products a user may wish to purchase, or recommendations relevant to other actions a user may perform using the web resources.

FIG. 2 illustrates an example of a data log. Data log 200 contains information about the interactions of users with a set of partially interlinked web resources (e.g., one or more web sites). In some embodiments, the information contained in data log 200 comprises attributes and values associated with those attributes. Thus, an attribute represents a specific type of information and may be paired with one or more values. These values may be chosen from a closed set of values in some cases. In the illustrated embodiment, attribute-value pair 210 corresponds to the attribute "Param-HTTP Req Accept-Language" and the value "en-us". In this example, the attribute corresponds to acceptable languages and the specific value corresponds to English. In other cases, this attribute may be set to other languages such as Chinese, German, etc.

There are many different types of possible attributes in data log 200. Attributes may include, for example, an ID number of a browser used to view the web resources, a height or width of the browser, the URL of the page previously visited by a user, the type of internet connection of a user, or other information related to the way in which the user connects to the web resources. Attributes may also include indications of whether the user has visited the website previously, the type of event resulting from a click of the user, the context of the click of the user, or other information related to the actions performed on a website by a user.

A clickstream data log may also include information other than attribute-value pairs. In some embodiments, data log 200 may include, for example, alphanumeric information (e.g., text) or numeric information that is not associated with a corresponding attribute. Information in a clickstream data log may relate to user interactions or may relate to information related to the data log itself, such as time stamp data, in some embodiments. There may exist many other types of information which may be included in a clickstream data log, including the previously mentioned information regarding connection information or user action information. The provided examples should not be interpreted to limit the content of potential clickstream data.

Figure 3:
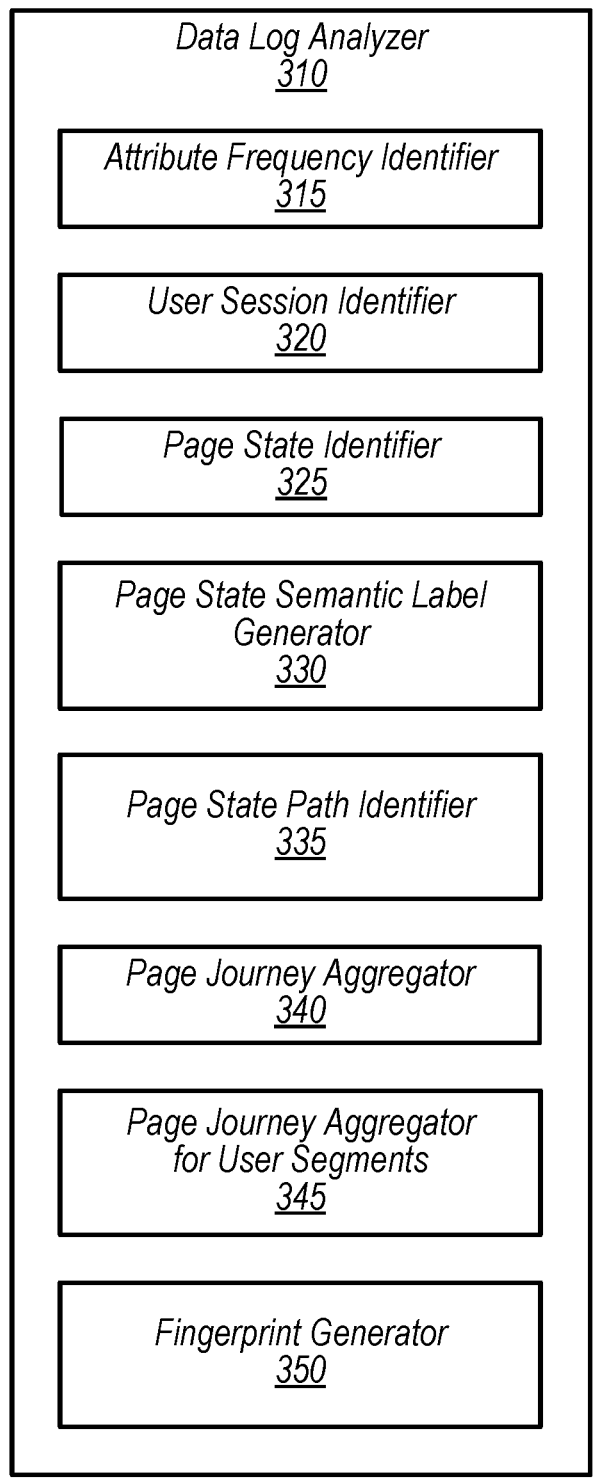
FIG. 3 is a block diagram illustrating a data log analyzer, according to some embodiments.

FIG. 3 illustrates an embodiment of data log analyzer 310 which may be used to process raw clickstream data and output aggregated page journeys. In the illustrated embodiment, data log analyzer 310 includes a number of modules which may be independent or may depend on the results of processing performed by a previous module. In some embodiments, data log analyzer 310 may include additional modules not illustrated in FIG. 3, for example a module that creates graphical representations of output data from analyzer 310.

As previously noted, the term "module" refers to circuitry configured to perform specified operations or to physical non-transitory computer readable media that stores information (e.g., program instructions) that instructs other circuitry (e.g., a processor) to perform specified operations. Such circuitry may implemented in multiple ways, including as a hardware circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In various embodiments, attribute frequency identifier module 315 is configured to identify frequencies of attributes. As discussed previously, a data log includes attributes and values associated with those attributes. The frequency of the attributes may correspond to the percentage of total attributes that a specific attribute appears, or the interval of time between successive appearance of a particular attributes. In some embodiments, identifying the frequency includes identifying how often specific values are paired with specific attributes, or it may include identifying a scope of the attributes, or the way in which an attribute corresponds to the web resources of the data log. In short, module 315 may make determinations of attribute frequency, value frequency, attribute-value pair frequency, or combinations thereof.

In some embodiments, the number of times a specific attribute (e.g., "Accept-Language" attribute-value pair 210) appears in a data log may be calculated. The number of times an attribute is associated with a specific value, for example "en-us" from attribute-value pair 210, may also be calculated. For example, "Accept-Language" may appear fifteen times in total, associated with "en-us" five times, and with "de" 10 times. In some embodiments, the number of times a specific value occurs, regardless of which attributes it is associated with, may be calculated.

Frequencies of occurrence may be computed for all attributes in a data log or a subset of attributes. Frequencies of occurrence may be calculated to correspond to an entire data log, subsets of a data log, multiple data logs, or subsets of multiple data logs. In some embodiments, frequencies of occurrence may be calculated for specific lengths of time, e.g. an hour, a day, etc., which may be within a single data log or spread across multiple data logs.

In some embodiments, attributes are classified based on the identified frequency of occurrence. Attributes may be classified by assigning attributes to a plurality of attribute categories that include at least a user attribute category, a site attribute category, and a page attribute category, in some embodiments. A user attribute category may be used to classify attributes relating to user characteristics, a site attribute category may be used to classify attributes relating to characteristics of the website or web resources, and a page attribute category may be used to classify attributes relating to characteristics of page states, in some embodiments. In some embodiments, the data log is a clickstream data log and page journey information is determined by performing a set of operations that includes, for a particular clickstream data log corresponding to a particular set of web resources, classifying attributes within entries in the particular clickstream data log based on a frequency of occurrence of attributes and associated attribute values of the entries.

In various embodiments, user session identifier module 320 is configured to identify user sessions. As previously noted, a "user session" refers to information in a data log that is associated with a particular user and satisfies some time-based criteria. One user session might include data related to a user's visit to a particular website; another user session for that user may correspond to a visit to that website or another website multiple days later. User sessions may include a user using multiple sets of resources from a website. In some embodiments, user sessions are identified based on attribute/value pairs that occur according to some threshold frequency. In other embodiments, user sessions are identified based on a fingerprint (that is, identifying information, which may be unique, for a particular user session) included in the data log. In yet other embodiments, if a fingerprint is not provided in the data log, a set of attributes may be used to approximate a fingerprint. Examples of attributes that may be used to approximate a fingerprint include but are not limited to web browser, screen resolution, device type, or other identifying features of a specific user. Approximating a fingerprint may include selecting a set of attributes that identify a user with a certain level of accuracy. For example, an approximate fingerprint may comprise twenty attributes that, when combined, may identify a user 95% of the time.

Page state identifier module 325 is configured to identify page states. As noted, a page state is a set of related attributes in a data log that occur together in a session. An identified page state may include multiple different attributes, and each attribute of the page state may include multiple values. For example, a page state may include attribute/value pairs A1V1, A2V2, A3V3, A3V4, etc., where A1, A2, etc. represent unique attributes, and V1, V2, etc. represent unique values. Every attribute in a data log may not be identified as part of a page state; for example, attributes that are common across many page states, or attributes that do not contain information relevant to page states.

In some embodiments, page states may be identified by module 325 for individual ones of groups of user sessions. Page states may be identified based on being accessed during a user session. Page states may also be identified based on a whole clickstream data log or on part of a clickstream data log. In some embodiments, page states may be identified based on the common attributes and values across all user sessions or a subset of user sessions. Page states may also be identified based on groups of users across multiple sessions. In some embodiments, identifying page states includes classifying attributes within entries in the data log based on a frequency of occurrence of the attributes and the associated attribute values. Identification of frequency of occurrence of attributes may be performed by module 315.

In various embodiments, page state semantic label generator 330 is configured to generate semantic labels of page states. The page journey information output by data log analyzer 310 may include semantic labels that describe the function (in human-understandable terms) of pages corresponding to different page states. In some embodiments, the attribute/value pairs associated with a page state are processed in order to determine a label. The text associated with a page state may be tokenized in order to be used for text mining models. In some embodiments, determining semantic labels for page states includes using the text mining model. A text mining model may process text data from the data log to identify specific words or groups of words that correspond to the meanings of page states. Generating the semantic labels with a text mining model may include using a training data set of page states where the labels have been manually defined.

Text mining may include analyzing large collections of text-based information in order to generate new information. One goal of text mining may be to discover relevant information in text sources by transforming the text into data that can be used for further analysis. This may be accomplished through the use of a variety of analysis methodologies, including natural language processing (NLP).

NLP is an example of a text mining method that performs linguistic analysis that may help a machine "read" text. NLP may use a variety of methodologies to decipher the ambiguities in human language, including but not limited to the following: automatic summarization, part-of-speech tagging, disambiguation, entity extraction and relations extraction, as well as disambiguation and natural language understanding and recognition. NLP software may include a knowledge base such as a detailed thesaurus, a lexicon of words, a data set for linguistic and grammatical rules, ontology, and up-to-date entities.

Examples of text mining algorithms include k-means clustering, Naive Bayes and linear support vector machine classification, text frequency-inverse document frequency vectorization, singular value decomposition as a part of a latent semantic analysis, or other algorithms.

In some embodiments, generating the labels includes developing a text frequency—inverse document frequency (TF-IDF) model and may include modifying the model using machine learning or deep learning techniques, for example sigmoid cross entropy. TF-IDF may be a method used in text mining to reflect the importance of a term to in relation to a larger set of terms and/or documents. For example, TF-IDF may indicate terms which are relevant to a certain page state in relation to the set of all page states. In some embodiments, text is extracted from each page state and TF-IDF may be used to calculate the importance of each word in the text extracted from the page state. Sigmoid cross entropy is an example of a loss function that may be applied to learning the text, in order to enable automatic labeling.

In various embodiments, page state path identifier module 335 is configured to identify paths through page states. In some embodiments, once the page states have been identified, the connections between page states may be identified. Page states may include information specifying the previous page state a user was interacting with or the next page a user was interacting with or both. A path or page path may be a set of page states and related information specifying the order in which page states were accessed by a user. In some embodiments, each of at least two page paths corresponds to a particular user session, or one or more page paths includes page states corresponding to different sessions of a particular user. In some embodiments, a page state that does not include information about a previous page state may indicate the beginning of a path. A page state that does not include information about a next page state may indicate the end of a path, in some embodiments.

In various embodiments, page journey aggregator module 340 is configured to aggregate page journeys. In some embodiments, the goal may be to build an aggregate model that represents the end user workflow. In some embodiments, the page paths of many different users may include partially overlapping sets of page states; a resulting aggregated page journey may include branches and information reflecting the proportions of page paths which indicate each branch.

Aggregating page journeys may be performed using multiple algorithms, including association rule-based algorithms and sequential pattern mining algorithms, among others. Association rule-based algorithms may be used to discover page states which commonly occur together. For example, a page path which includes page states 1 and 2, in any sequence, may also include page state 3. Sequential pattern mining algorithms may be used to determine page state sequences. For example, a page path which includes page states 1 and then page state 2, in that order, may then include page state 3. In some embodiments, these algorithms may be used together, sequentially, or in various combinations with other algorithms in order to aggregate a page journey.

In some embodiments, thresholds may be supplied by the user to specify minimum, maximum, or other values of frequency for selecting frequent page state sequences. For example, a minimum frequency of five instances per hour may be specified to select a particular page state sequence. In some embodiments, aggregating page journey information is based on frequencies of transitioning between a first set of page states and one or more other sets of page states.

In various embodiments, page journey aggregator for user segments module 345 is configured to aggregate page journeys for user segments. In some embodiments, users may be grouped into segments, where specific segments indicate common characteristics of the users. Examples of characteristics which may be used to segment users include income, employment status, geographical location, or other characteristics of a user which may influence a user's web browsing behavior. In some embodiments, aggregating of page journeys may be performed separately for page paths belonging to users of different segments. The aggregated page journeys may be used to infer differences in web browsing or online shopping behaviors between segments that may be used to improve the service provided by the website or web resources.

In various embodiments, fingerprint generator module 350 is configured to analyze attributes to generate a fingerprint. In some embodiments, a fingerprint may be a value, attribute, or attribute-value pair that corresponds to a user session or to a specific user. Fingerprints (or fingerprint values) may be generated by determining a set of attributes from entries of the data log that identity a user session and aggregating the set of attributes. In some embodiments, a fingerprint may be unique to a specific user session. In other embodiments, a fingerprint may be associated with multiple user sessions, or it may have the possibility of being associated with other user sessions but may not often actually be associated with more than one user session. Fingerprint and fingerprint value are used interchangeably in this disclosure. In some embodiments, fingerprints may include particular attributes of the web resources of a data log, where the value associated with the particular attribute corresponds to a specific user.

In some embodiments, generating a fingerprint may include aggregating multiple attribute-value pairs. For example, attributes corresponding to browser, screen resolution, or geographical location may be aggregated to create a single value which may occur uncommonly enough to identify a user session. In some embodiments, the attributes to be aggregated may be identified based on the frequency of occurrence of the attributes, the values, attribute-value pairs, etc. In some embodiments, the attributes to be aggregated may be predetermined, specified by a user, or chosen in some other way so as to generate a fingerprint value.

In some embodiments, grouping entries in a data log may include using a first fingerprint value to identify entries that correspond to a particular user session, using a second fingerprint value created from values in the data log to determine particular user sessions that correspond to a particular user, and assembling the groups, each of which corresponds to a particular user, based on the second fingerprint. Fingerprints may be used to identify user sessions, identify page paths, or for other purposes related to creating page journey information. In some embodiments, fingerprints may be used to aggregate groups of users based on characteristics of the users.

Figure 4:
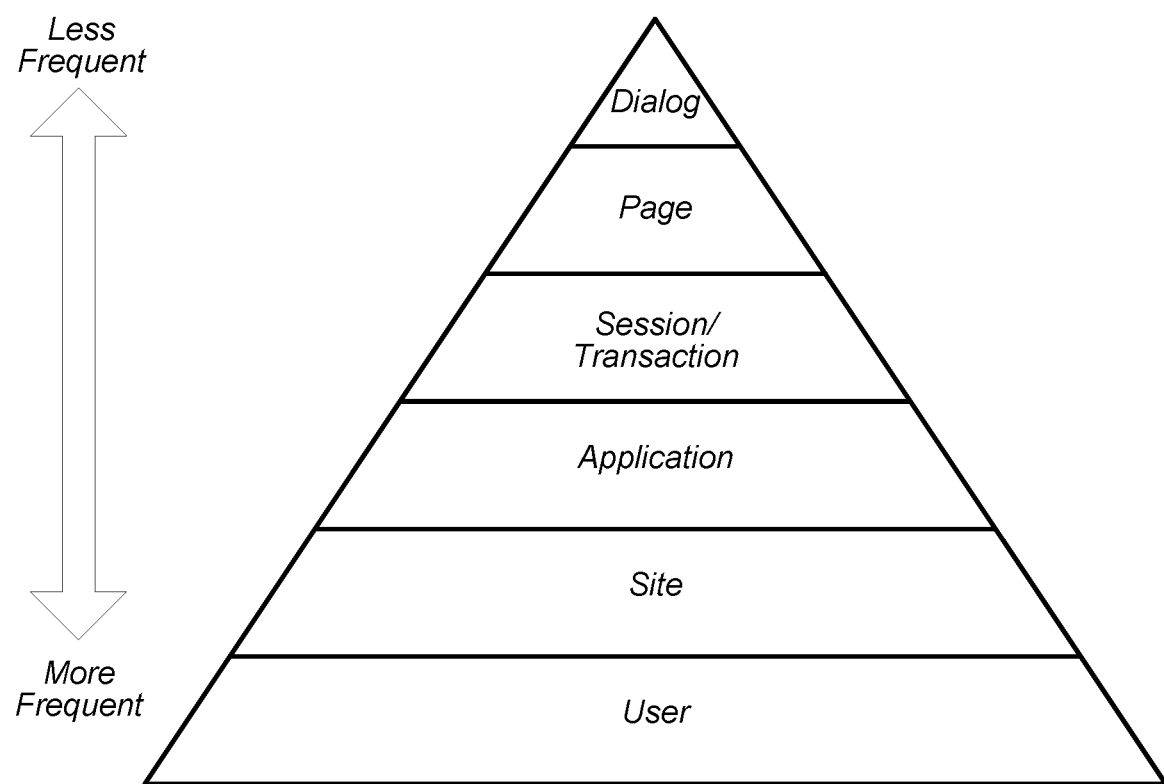
FIG. 4 is a diagram illustrating levels of classification, according to some embodiments.

Turning now to FIG. 4, a pyramid is illustrated that represents one type of hierarchical scope that may be used to classify attributes and values. Attributes and values such as those of FIG. 2 may be processed to identify the frequency of occurrence of the attributes and values, as discussed with module 315 of FIG. 3. In the illustrated embodiment, the levels of the pyramid include "user", "site", "application", "session/transaction", "page", and "dialog"; these levels may indicate expected relative levels of frequency of different types of attributes within a data log. The pyramid illustrated in FIG. 4 illustrates one potential way to classify attributes/attribute-value pairs; other such classifications are possible. The present disclosure is in no way limited to the frequency classification scheme shown in FIG. 4.

In some embodiments, attributes that occur most commonly, or that appear with the same values most frequently, may be classified in the user scope. These attributes may be indicative of parameters of websites or web resources that correspond to a particular user that is interacting with the web resources. Non-limiting examples may include attributes related to the size of a user's screen, a user's browser, an account belonging to a user, or other attributes related to a specific user.

In some embodiments, attributes and attribute/value pairs that are associated with a site of the web resources may change or appear in the clickstream data log less frequently than user attributes. Examples of sites included within a set of web resources may include a site for streaming video, a site for online commerce, or other sites which may be related to a single set of web resources.

As shown, another level of a hierarchical scope may be the application level. In the illustrated embodiment, this level includes attributes and values that are less frequent than site level attributes and values. Examples of applications include a mobile version of a website, an application based on a kiosk, or an application based on a desktop interface.

In the illustrated embodiment, the level of hierarchical scope that is less frequent than the application scope is the session/transaction scope. In some embodiments, this scope may include the set of attributes that a user interacts with during one use of a set of web resources. For example, a session may include all of the interactions of a user from login to completion of a task. As a more specific, but non-limiting, example, consider a user purchasing a pair of shoes from an online commerce application. The user may log in to an account, browse several pairs of shoes, add one to the shopping cart, and check out. This may be considered as one session. In other embodiments, the user may perform only some of those actions and then log off. This may still be considered a session.

In some embodiments, the page scope is a less frequent scope than the session scope. This may include attributes which are related specifically to one page state. Following the previous example, a page state may display information about a pair of shoes. Attributes of that page state which may be in the page scope include information about the appearance or price of the shoes. In some embodiments, multiple pages are included in a session scope.

In some embodiments, page states may be defined within a page scope; during each session common attributes and their values may exist in each page state. A set of common attributes $PS_i = \Sigma_{n=1}^{N}(A_iV_i)$ may be defined as a page state, where N is the number of common attributes, $A_i$ is ith attribute, and $V_i$ is the ith value in this page. In some embodiments, a page state may be a collection of frequent attributes and frequent values from data logs (e.g. a clickstream) that are grouped together. In some embodiments, page states may include the same attribute associated with more than one value, for example multiple page states may share the same URL. The frequent attributes and values may be dynamically defined from clickstreams within the scope of a website, depending on various preference and frequency threshold settings. The frequency of the set of attributes in a page may be defined as $\Sigma_{n=1}^{N} Feq(A_iV_i)=1$. Given a set of attributes and values, the calculated frequency may be used to provide identifications of a set of page states based on the scope of clickstream entries.

For a non-limiting example of identifying the scope of an attribute contributing to the determination of page states, consider an attribute called "Container" that may be paired with the value "Shopping Cart" in 14% of entries in a data log. In this example, if a lower threshold of 12% is set to classify this attribute/value pair in the page scope then this pair would meet the threshold. In this embodiment, the attribute/value pair of "Container" with "Shopping Cart" may be considered as one of a set of attribute value pairs that make up a page state.

In the illustrated embodiment of FIG. 4, the scope with the least frequent occurrence of attributes is the dialog scope. This may include attributes or values that change on every access by a user, or that occur more frequently than attributes associated with a page. For example, information related to security of a page or the time a web resource was accessed may be different for every interaction.

In some embodiments a hierarchical scope may have more or fewer levels. Levels that have not been discussed here may be included in a hierarchy of scopes, levels may be left out of a hierarchy, or a combination of the two. The illustrated embodiment of FIG. 4 is not intended to limit the levels or uses of a hierarchy for determining the scope of information in clickstream data logs. Other information may be organized using a hierarchy, including variables or parameters which have scopes similar to those described or parameters which do not correspond to specific scopes.

In some embodiments, semantic labels may be determined by running page state semantic label generator module 330 separately for different classifications of attributes, where the attribute classification may be performed by attribute frequency identifier module 315. In some embodiments, attribute classifications may correspond to the levels of the hierarchy of scopes discussed above. Examples of instances in which semantic label generator 330 may be run separately include: for attributes classified as user attributes, attributes classified as application attributes, and attributes classified as page attributes.

Figure 5:
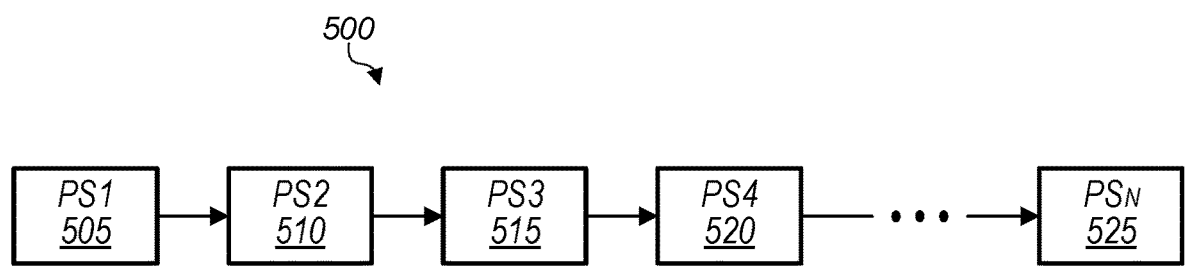
FIG. 5 is a block diagram illustrating a page path, according to some embodiments.

Turning now to FIG. 5, 500 illustrates a sequence of page states. Page states may be determined to be in a sequence using information from a data log that indicates the previous page state a user was interacting with or the next page state a user interacted with. For example, page state 505 may include information indicating that the next page state in the sequence may be page state 510. In the illustrated embodiment, page state 515 is indicated to follow page state 510 and precede page state 520. In the illustrated embodiment, page state 525 does not indicate a page state following it, and so is the final page state of the page path. In some embodiments, sequences of page states, or page paths, may be constructed from all of the entries in a data log or in other embodiments some entries may be discarded. For example, attributes which do not meet a threshold to be included in a page state may not be included when page paths are identified.

Figure 6:
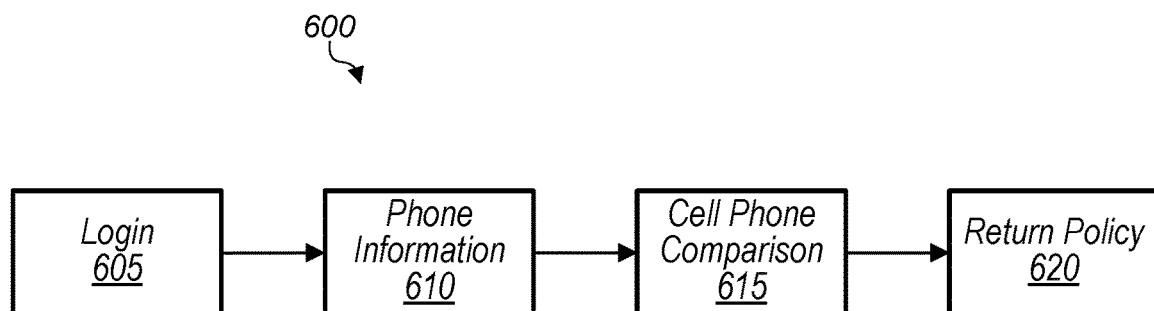
FIG. 6 is a block diagram illustrating a page path with semantic labels, according to some embodiments.

FIG. 6 illustrates an embodiment of a page path that includes page states that have been labelled according to a semantic meaning. 600 at FIG. 6 illustrates an example of a page path that includes four page states, 605, 610, 615, and 620. Page state 605 is labeled "Login", which may correspond to a page state for logging in, page state 610 is labeled "Phone Information" which may correspond to a page state giving information about a phone for purchase, page state 615 is labeled "Cell Phone Comparison" which may correspond to a page state giving information comparing different cellular telephones, and page state 620 is labeled "Return Policy" which may give information relating to a policy for returning cell phones, in the illustrated embodiment. The labels may be generated algorithmically based on the attributes and values of a page state. In some embodiments, a training set of page states may be labelled by system administrators that may be used to assist the algorithmic labelled process.

In some embodiments, the texts of attribute values, $\Sigma_{n=1}^{K}(V_i)$, may be selected from the attributes, $\Sigma_{n=1}^{K}(A_i)$ ($k \leq N$), where N is the number of attributes in a page. In these embodiments, all attribute/value pairs may be used (e.g. K=N) or a subset of attribute/value pairs may be used (e.g. K<N).

Table 1 illustrates a set of page states and attributes with text values that may be used to label the set of page states. Table 1 illustrates a Session ID corresponding to a particular user session, a page state ID, corresponding to an identified page state, attributes $A_1$ through $A_k$, with associated text values, which correspond to the page state, and a resulting label that may have been determined from the attributes and values.

In some embodiments, tokenization for given texts in each page may be performed, and a TF-IDF model may be developed. Tokenization may be performed by parsing text into words, sentences, paragraphs, or other subsections. In some embodiments, the text may be the values associated with attributes, such as attributes $A_1$ through $A_k$ shown in Table 1. The text of the attributes and a training dataset $D_t$ that may label each example page's semantics may be used as inputs for the model. The model may be modified using deep learning techniques, including but not limited to sigmoid cross entropy.

TABLE 1

| Session ID | Page State ID | $A_1$ | $A_2$ | ... | $A_K$ | Label |
|---|---|---|---|---|---|---|
| S1 | PS1 | text value | text value | ... | text value | Phone information |
| S1 | PS2 | text value | text value | ... | text value | Customer bill |
| S3 | PS5 | text value | text value | ... | text value | Purchase cart |
| S4 | PS10 | text value | text value | ... | text value | Throw away |

In some embodiments, the labelling model may be used to process 70% of training dataset $D_t$. In other embodiments, different percentages of the training dataset may be used. To evaluate the accuracy of the model, the remaining 30% of the training dataset may be used after training, in the embodiment discussed above. Other embodiments may use all of the dataset that was not used to train the model, some of the unused dataset, or other subsets of the dataset or other sources of data.

Table 2 illustrates an example of a labeled set of page states, where the correctness of a label is evaluated by semantic label generator 330 by comparing the predicted label with the label from training data. In Table 2, page state PS5 has a predicted label of "Purchase order" and training data label "Purchase cart.", which is an incorrect label.

TABLE 2

| Session ID | Page State ID | Predicted Label | Label | Correctness |
|---|---|---|---|---|
| S1 | PS1 | Phone information | Phone information | Yes |
| S1 | PS2 | Customer bill | Customer bill | Yes |
| S3 | PS5 | Purchase order | Purchase cart | No |
| S4 | PS10 | Throw away | Throw away | Yes |

In some embodiments, the model may be developed independently for each scope in the hierarchy previously discussed. For example, the model may be run based only on attributes in the session scope, or only on attributes in the page state scope. In other embodiments, all relevant attributes and values may be used as inputs.

Figure 7:
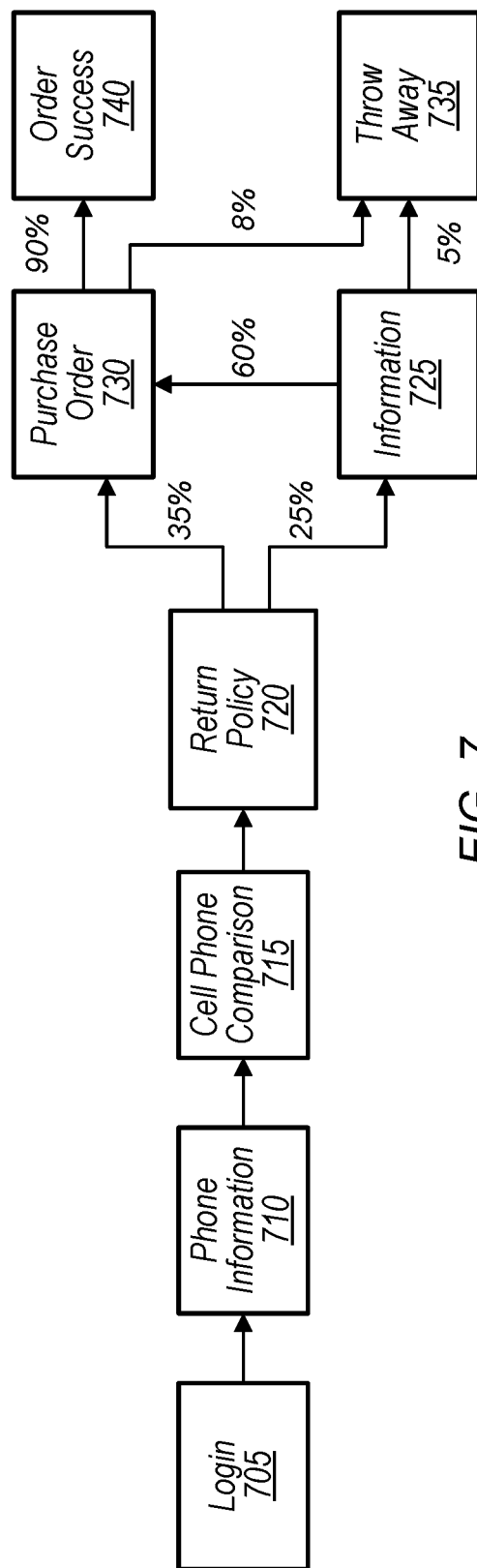
FIG. 7 is a diagram illustrating a page journey, according to some embodiments.

Turning now to FIG. 7, a page journey is illustrated. In some embodiments, multiple page paths may be combined in order to provide information regarding the set of page states that users may traverse in the process of using the web resources underlying the clickstream. The arrows in FIG. 7 illustrate the possible flows in this embodiment, including the number of users that may have traversed a specific page path, represented as a percentage. In some embodiments, different types of information may be stored along with path and percentage information. As a non-limiting example, information may be included about the amount of time users view a page state, a user's behavior with respect to a page state, or other information that may be included in a clickstream.

In the illustrated example, page states 705, 710, 715, and 720 are shared in common between many users. In this embodiment, the page state following page state 720 may be page state 725 or page state 730; as illustrated, 25% of users may progress to page state 725 and 35% of users may progress to page state 730. The percentage of users may not be required to add to 100%; in some embodiments, users may follow paths that may not be aggregated (e.g. uncommon paths, paths including page states which were not identified, etc.) or users may end their page journey without progressing to another page state. In the illustrated embodiment, page states 735 and 740 are both possible final states of page paths.

In some cases, the process for aggregating page paths includes association rule-based algorithms. Table 3 illustrates examples of rules, indicated by a Rule ID, which correspond to specific applications, indicated by Application ID, and which are represented as a series of page states in brackets and the page state or page states which may be next in the page path. For example, Rule ID R1 shows a rule that indicates page paths which include one of page states PS1, PS2, PS3, PS4, PS5 and then transition to page state PS6. The "Confidence" column in Table 3 indicates the probability that a page path may satisfy the rule. In the example illustrated by Table 3, 72.8% of page paths which include page states PS1, PS2, PS3, PS4, and PS5 will also include page state PS6.

TABLE 3

| Rule ID | Application ID | Frequent Page States | Confidence |
|---|---|---|---|
| R1 | A1 | {PS1, PS2, PS3, PS4, PS5} -> {PS6} | 72.8% |
| R2 | A1 | {PS23, PS45, PS67, PS100} -> {PS15, PS16} | 90.45% |
| R3 | A2 | {PS23, PS45, PS67, PS100} -> {PS25, PS96} | 83.56% |
| ... | ... | ... | ... |

Various techniques may be used to select the page sequences identified by the rules. In some embodiments, a set of rules with the highest confidence value may be selected; for example, the 100 rules with the highest confidence value may be chosen. In other embodiments, rules with a confidence value higher than a specific threshold may be chosen; for example rules with a confidence value of more than 50% may be selected. In some embodiments, rules which involve page states that have been labelled (e.g. by the semantic labelling process) a certain way may be chosen. For example, rules that include states labelled "Checkout" and "Purchase Complete" may be selected. Combinations of these examples may be used, as well as other methods for selecting rules; the provided examples are not meant to be limiting.

FIG. 8A illustrates a similar embodiment of a page journey as FIG. 7. Page states 805-840 have been labelled, identified as a path, and aggregated in the illustrated embodiment. In the illustrated embodiment, the indicated percentages correspond to data coming from a particular time period, t1. In some embodiments, the time period t1 may include the beginning of the clickstream to a particular time in the clickstream. In other embodiments, the time period t1 may include a subset of the clickstream not including the beginning or it may include the end of the clickstream.

FIG. 8B illustrates a similar embodiment of a page journey as FIG. 8A. Similarly, page states 855-890 have been labelled, identified as a path, and aggregated in the illustrated embodiment. The percentages of users corresponding to specific paths in the illustrated embodiment of FIG. 8B is different from FIG. 8A, as is the specified time period, t2. In some embodiments, the second time period, t2, does not include data from the first time period, t1. t2 may include data from a later time period than t1, or t2 may include data that is earlier than t1. The data in time periods t1 or t2 may not be contiguous; for example, time periods may include data from 6 different days, with gaps of days or weeks between them. Time period t2 may include data that chronologically falls between portions of time period t1, or time period t1 may include data that chronologically falls between portions of time period t2.

In some embodiments, t1 and t2 may be separated by a change in the web resources of the clickstream data log. As a non-limiting example, the background color of a login page may be one color for the data of t1 and another color for the data of t2. Attributes of entries of the clickstream data log may be different, or value of attributes may be different.

In some embodiments, page journey information from subsections of the data log corresponding to time periods before and after a specific time may be compared. Comparison of page journeys may be used to determine the effects of altering the set of web resources; for example, changes to the wording of user agreements or changes to the visual presentation of a page state may correspond to changes in the percentage of users taking a specific page path or the amount of time users spend on a specific page state. Some additional non-limiting examples of changes include adding promotions or updating page presentation styles. In some embodiments, sequential pattern mining algorithms can provide insights that may determine the most frequent page sequence across the whole site, or may help to evaluate the effectiveness of changes of attribute value updates.

In the illustrated examples of FIGS. 8A and 8B, a change in the web resources may be made between time periods t1 and t2 (e.g. the color of the "Buy" button on the Purchase Order page). In FIG. 8A, the percentage of page paths that include moving from page state 830 to page state 840 is 90%. In FIG. 8B, the percentage of page paths that include moving from page state 880 to page state 890 is 91%. Similarly, the percentage of page paths that include moving from page state 825 to page state 835 is 5% in FIG. 8A, compared to 7% moving from page state 875 to page state 885. Transition percentages may change for each path in a page journey, as illustrated in FIGS. 8A and 8B. In this embodiment, the change may result in an increase in the percentage of users successfully ordering a product, which may be useful information.

In some embodiments, aspects of a page journey besides the percentage of users moving from one page state to another may change based on changes to the web resources. For example, the length of time a user views a page state before moving to another may be recorded. This may be referred to as a "decision time", "dwell time", or other name. In the illustrated embodiment, the decision time for each page state may change from time period t1 to time period t2, or the decision times for some page states may change while others do not. As an example, the color of a "Buy" button may be changed between time periods t1 and t2 in the illustrated embodiment of FIGS. 8A and 8B. In this example, the decision time for page state 830 may be 5 seconds and the decision time for page state 880 may be 3 seconds, which may indicate an improvement in the user interface.

In some embodiments, comparing page journeys may provide recommendations for potential methods to improve the site and enhance user experiences. Page journey information may be used to reduce user wait to or to remove redundant pages from page paths. In some embodiments, page journey information may be used to modify, in real time, a user experience of a user interacting with the set of web resources by changing user options at a particular page state. Real time may be understood to mean processes happening with a small enough lag so as to be unnoticed by a user or fast enough to not be detrimental to a user experience. In some embodiments, page journey information may be displayed by a graphical user interface.

Figure 9:
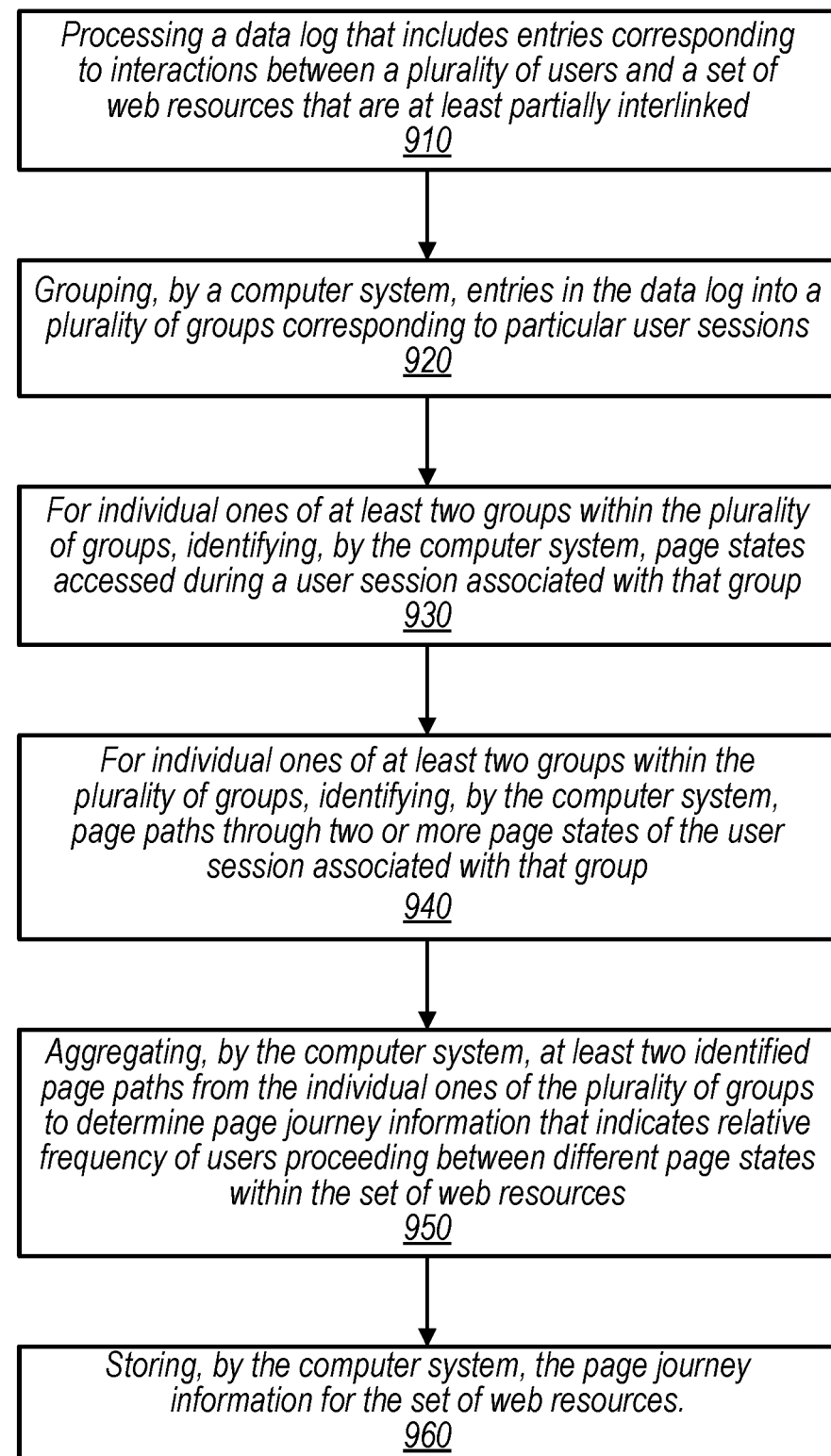
FIG. 9 is a flow diagram illustrating a method for analyzing a data log, according to some embodiments.

FIG. 9 is a flow diagram illustrating a method for analyzing a data log, according to some embodiments. The method shown in FIG. 9 may be used in conjunction with any of the computer systems, devices, elements, modules, or components disclosed herein, among other devices. In various embodiments, some of the method elements shown may be performed concurrently, in a different order than shown, or may be omitted. Additional method elements may also be performed as desired.

At 910 in the illustrated embodiment, a data log is processed. The data log, which may be clickstream data, corresponds to interactions between a plurality of users and a set of web resources that are at least partially interlinked, in some embodiments. The web resources may be web sites corresponding to various purposes, including but not limited to online commerce, online services, etc.

At 920 in the illustrated embodiment, a computer system groups entries in the data log into a plurality of groups correspond to particular user sessions. In the illustrated embodiment, a user session may include the set of web resources accessed by the user in one period of time. In some embodiments, all of the entries in the data log may be grouped into user sessions, while in other embodiments some of the entries may not be grouped. Grouping into user sessions may include first grouping by one of user or session and then grouping by the other.

At 930 in the illustrated embodiment, the computer system identifies, for individual ones of at least two groups within the plurality of groups, page states accessed during a user session associated with that group. In the illustrated embodiment, the groups are the groups of user sessions from 920 and different groups may have page states identified separately. All groups may have page states identified, or some may not. The page states may be identified from the entire data log and then the page states may be identified to correspond to a particular group.

At 940 in the illustrated embodiment the computer system identifies, for individual ones of at least two groups within the plurality of groups, page paths through two or more page states of the user session associated with that group. In the illustrated embodiment, the plurality of groups is the set of groups from 930 that correspond to user sessions and have a set of page states.

At 950 in the illustrated embodiment, the computer system aggregates at least two identified page paths from the individual ones of the plurality of groups to determine page journey information that indicates relative frequency of users proceeding between different page states within the set of web resources. In the illustrated embodiment, the page paths of 940, are aggregated. The groups may be the groups of user sessions from 920, with identified page states, where the page paths have been identified from the page states. At least two page paths are aggregated in the illustrated embodiment, but in some embodiments a large plurality of page paths may be aggregated.

At 960 in the illustrated embodiment, the computer system stores the page journey information for the set of web resources. The information may be stored on any of a multitude of storage media, including but not limited to hard drives, tape, volatile memory, etc.

Figure 10:
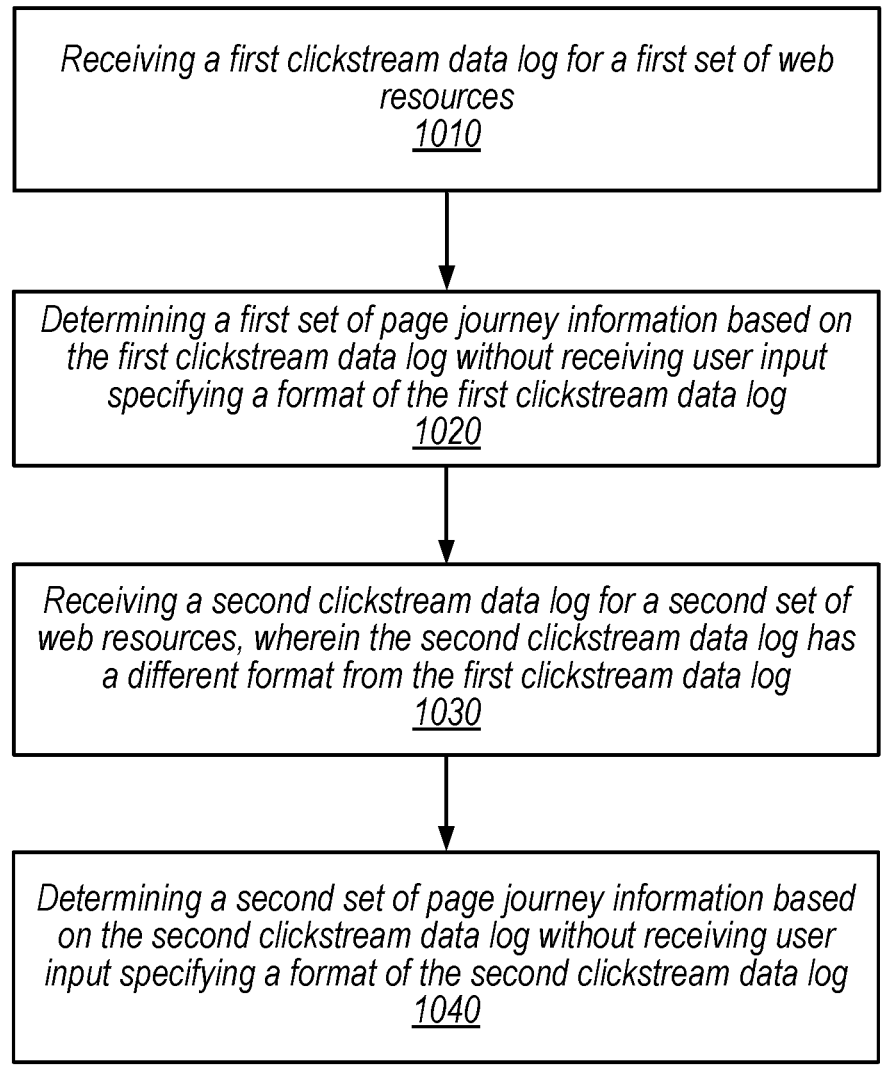
FIG. 10 is a flow diagram illustrating a method for analyzing more than one data log, according to some embodiments.

FIG. 10 is a flow diagram illustrating a method for analyzing a data log, according to some embodiments. The illustrated method specifically includes determining page journey information without user input specifying a format of the data log. The method shown in FIG. 10 may be used in conjunction with any of the computer systems, devices, modules, elements, or components disclosed herein, among other devices. In various embodiments, some of the method elements shown may be performed concurrently, in a different order than shown, or may be omitted. Additional method elements may also be performed as desired.

At 1010 in the illustrated embodiment, a first clickstream data log for a first set of web resources is received. The data log may be received from an internet connected source, a local network source, a physical media, or other methods of receiving data. The first set of web resources may correspond to a single website, multiple related or unrelated websites, or other kinds of web resources.

At 1020 in the illustrated embodiment, a first set of page journey information is determined based on the first clickstream data log without receiving user input specifying a format of the first clickstream data log. Page journey information may be determined according to the methods described earlier, or alternative methods may be used. In some embodiments, user sessions, page states, and page paths may be identified. In the illustrated embodiment, the format of the data log that is not specified may include the names of attributes, the types of attributes, the meaning of attributes, the possible values of attributes, or other properties of entries of the data log. In some embodiments, some information about the format of the data log may be known, but other information may not be specified.

At 1030 in the illustrated embodiment, a second clickstream data log for a second set of web resources is received, wherein the second clickstream data log has a different format from the first clickstream data log. In some embodiments, the format of the second data log may not be known, but may be different than the format of the first data log. The format of the second data log may be partially known, in some embodiments, and the known part may be the same or different from the format of the first data log. In some embodiments, the format of the second data log differs from the format of the first data log in at least one of: attribute name or attribute definition. In some embodiments, the difference in the format of the data logs is based at least in part on the second set of web resources being programmed using a different programming language than the first set of web resources.

At 1040 in the illustrated embodiment, a second set of page journey information is determined based on the second clickstream data log without receiving user input specifying a format of the second clickstream data log. Similarly to 1020, determining page journey information may be performed according to different methods, including but not limited to the methods described previously. In some embodiments, user input may still be required to run the analysis, but not to specify the format of the second clickstream data log. In some embodiments, the format of the data log may be partially specified by the user, or in other embodiments no part of the format of the data log may be specified.

Figure 11:
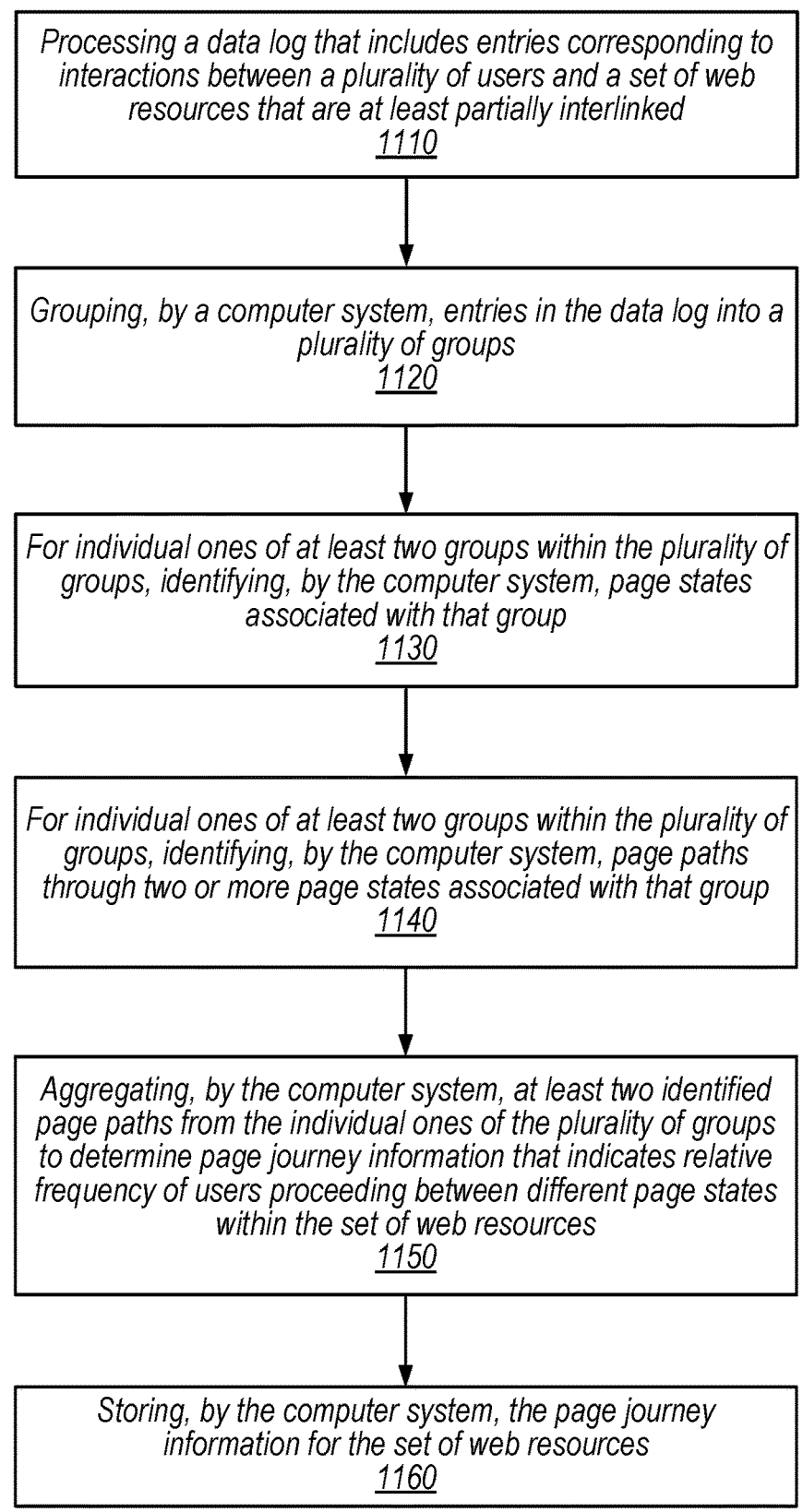
FIG. 11 is a flow diagram illustrating a method for analyzing a data log, according to some embodiments.

FIG. 11 is a flow diagram illustrating a method for analyzing a data log, according to some embodiments. The method of FIG. 11 allows for generating different types of page paths. For example, page paths that correspond to a single user session, or page paths that correspond to different sessions of a particular user. The method shown in FIG. 11 may be used in conjunction with any of the computer systems, devices, modules, elements, or components disclosed herein, among other devices. In various embodiments, some of the method elements shown may be performed concurrently, in a different order than shown, or may be omitted. Additional method elements may also be performed as desired.

At 1110 in the illustrated embodiment, a data log that includes entries corresponding to interactions between a plurality of users and a set of web resources that are at least partially interlinked is processed. 1110 is similar to 910 and will not be discussed further here.

At 1120 in the illustrated embodiment, a computer system groups entries in the data log into a plurality of groups. Similar to 920, 1120 is different in that the groups are not specified to be based on user sessions. The groups may be based on user sessions, or the groups may be based on only users, only sessions, or an entirely different characteristic or characteristics of the data log, for example time period or attributes of the entries.

At 1130 in the illustrated embodiment, the computer system identifies, for individual ones of at least two groups within the plurality of groups, page states accessed associated with that group. 1130 is similar to 930, a difference being that 1130 does not specify user sessions. The groups may be based on user sessions, but may be based on other characteristics, as discussed above. The page states associated with the groups may be identified based on the same characteristics as the groups, they may be identified generally from the data log and associated with the groups based on the same or other characteristics, or other identifications may be performed.

At 1140 in the illustrated embodiment, the computer system identifies, for individual ones of at least two groups within the plurality of groups, page paths through two or more page states associated with that group. As discussed previously, with reference to 940 and others, page paths are identified based on ordering of information in the data log, including but not limited to the order in which users visited the page states.

At 1150 in the illustrated embodiment, the computer system aggregates at least two identified page paths from the individual ones of the plurality of groups to determine page journey information that indicates relative frequency of users proceeding between different page states within the set of web resources. Largely similar to 950, 1150 does not specify groups based on user sessions. The method for aggregating page journeys may be otherwise similar, or it may be different in some aspects.

At 1160 in the illustrated embodiment, the computer system stores the page journey information for the set of web resources. The information may be stored on any of a multitude of storage media, including but not limited to hard drives, tape, volatile memory, etc.

Figure 12:
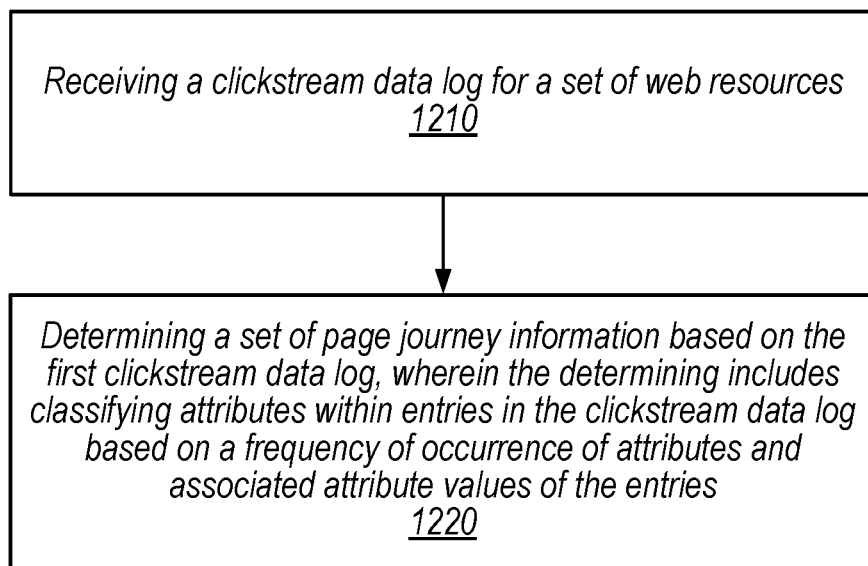
FIG. 12 is a flow diagram illustrating a method for analyzing a data log, according to some embodiments.

FIG. 12 is a flow diagram illustrating a method for analyzing a data log in which a frequency analysis is used to help determine page journey information, according to some embodiments. The method shown in FIG. 12 may be used in conjunction with any of the computer systems, devices, modules, elements, or components disclosed herein, among other devices. In various embodiments, some of the method elements shown may be performed concurrently, in a different order than shown, or may be omitted. Additional method elements may also be performed as desired.

At 1210 in the illustrated embodiment, a clickstream data log for a set of web resources is received. A clickstream data log may contain information about interactions of users with a set of web resources, as previously described. Receiving may be performed in a number of ways, including but not limited to receiving via a network or a physical medium.

At 1220 in the illustrated embodiment, a set of page journey information is determined based on the first clickstream data log, wherein the determining includes classifying attributes within entries in the clickstream data log based on a frequency of occurrence of attributes and associated attribute values of the entries. In the illustrated embodiment, attributes may be classified based on their frequency of occurrence in a manner similar to the embodiment illustrated in FIG. 4. Attributes and the associated values may be classified based on their frequency of occurrence, or attributes without values may be classified, or values without attributes may be classified. Classification may include comparing the frequency of occurrence against a threshold, or multiple thresholds, or no thresholds at all, in some embodiments.

Figure 13:
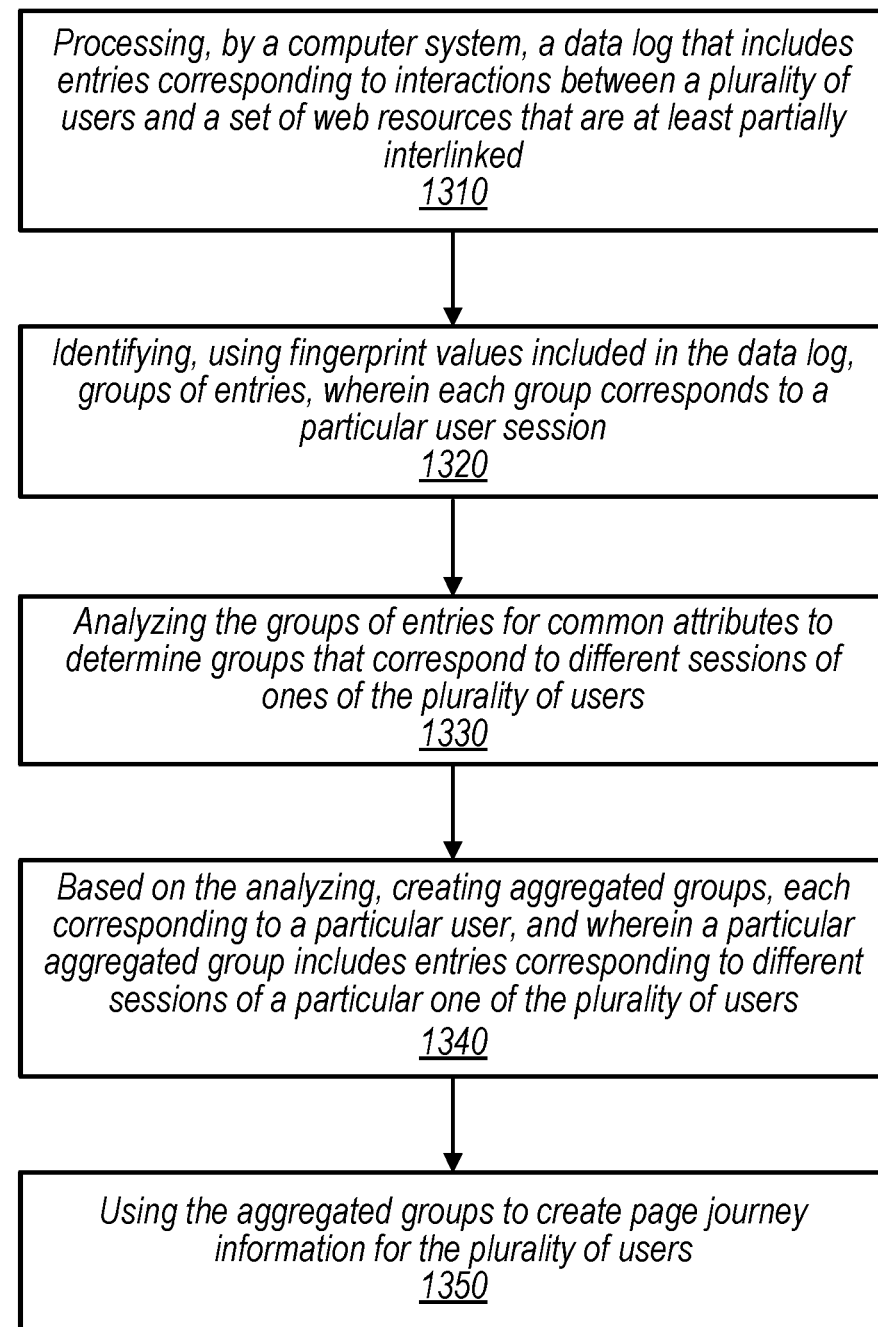
FIG. 13 is a flow diagram illustrating a method for analyzing a data log, according to some embodiments.

FIG. 13 is a flow diagram illustrating a method for analyzing a data log, according to some embodiments. The illustrated embodiment includes using fingerprint values to identify user sessions. The method shown in FIG. 13 may be used in conjunction with any of the computer systems, devices, modules, elements, or components disclosed herein, among other devices. In various embodiments, some of the method elements shown may be performed concurrently, in a different order than shown, or may be omitted. Additional method elements may also be performed as desired.

At 1310 in the illustrated embodiment, a computer system processes a data log that includes entries corresponding to interactions between a plurality of users and a set of web resources that are at least partially interlinked. The illustrated embodiment of 1310 is similar to 910 or 1110; details may be found in the previous discussions related to those embodiments.

At 1320 in the illustrated embodiment, groups of entries are identified using fingerprint values included in the data log, wherein each group corresponds to a particular user session. In some embodiments, fingerprint values include attributes from the data log paired with specific values which may uniquely or semi-uniquely identify a user session. Fingerprints may include other entries in the data log or other information associated with the data log. In some embodiments, at least one of the web resources associated with the data log may generate a fingerprint and add it to the clickstream when a user interacts with the web resources. In some embodiments, a server which may host web resources may add a fingerprint to the clickstream. In some embodiments, a fingerprint may not be included in the clickstream, but may be generated based on attributes of the clickstream. For example, attributes relating to web browser, screen resolution, operating system, or geographical location may be aggregated to create a value which may comprise a fingerprint.

In some embodiments, a fingerprint value may be added to a clickstream for every entry, or a fingerprint may be included in the clickstream for certain entries. As an example, a fingerprint may be inserted every time a user interacts with a web resource. In some embodiments, specific users may be identified by a fingerprint, or specific sessions, or specific user sessions. In some embodiments, fingerprints may identify only a part of a session. The fingerprint value may change over the course of a session, or the fingerprint may change for the same user over a different time period.

At 1330 in the illustrated embodiment, the groups of entries are analyzed for common attributes to determine groups that correspond to different sessions of ones of the plurality of users. In some embodiments, a fingerprint may identity user sessions but may not identify the same user during different sessions. In some embodiments, common attributes may include attributes which may identify a particular user. For example, an attribute relating to the specific account number for an account belonging to a single user may, when associated with a specific value, identify a particular user. In some embodiments, several attributes, values, or attribute value pairs may be aggregated to identify a particular user over several sessions. In the illustrated embodiment, groups of entries that have been grouped according to user sessions are analyzed to determine attributes which commonly occur for different groups. These common attributes may determine a particular user; some groups may correspond to the same user, and some groups may be different users.

At 1340 in the illustrated embodiment, aggregated groups are created based on the analyzing, wherein each group corresponds to a particular user, and wherein a particular aggregated group includes entries corresponding to different sessions of a particular one of the plurality of users. In some embodiments, the common attributes of 1330 identify a particular user; the common attributes may be used to identify a particular user for the groups previously identified, and the groups with identified particular users may be aggregated into larger groups. In some embodiments, entries of the data log are grouped by user session, and the user session groups are further grouped according to user. In other embodiments, the entries may be grouped by user and then subgroups of session may be identified. In some embodiments, a particular user may have multiple corresponding sessions in the data log and other particular users may have a single session. Aggregating sessions of particular users may include combining entries for multiple user sessions, adding information to entries to indicate the particular user, or other indications or combinations of entries of the data log.

In some embodiments, aggregated sessions may not be from adjacent periods of time, or the aggregated sessions may not correspond to similar actions. In some embodiments, a particular aggregated group includes a first entry corresponding to a first transaction of the particular user, and the particular aggregated group includes a second entry corresponding to a second transaction of the particular user. A transaction may be a financial transaction, (e.g. an online purchase) or may refer to an interaction of the user with the web resources. In some embodiments, a transaction may be a user requesting and receiving information from the web resources. In the illustrated embodiment, user sessions corresponding to two or more different transactions may be aggregated to a single group. In some embodiments, a particular aggregated group includes a first entry corresponding to a first device of the particular user, and the particular aggregated group includes a second entry corresponding to a second device of the particular user. A device may include a cellular telephone, desktop computer, or other computing device that allows access to the web.

At 1350 in the illustrated embodiment, the aggregated groups are used to create page journey information for the plurality of users. In some embodiments, this includes identifying page states, page paths, and page journeys as described previously. In some embodiments, the page states, page paths, and page journeys may be identified, determined, generated, or aggregated before the user sessions or particular users are identified.

Figure 14:
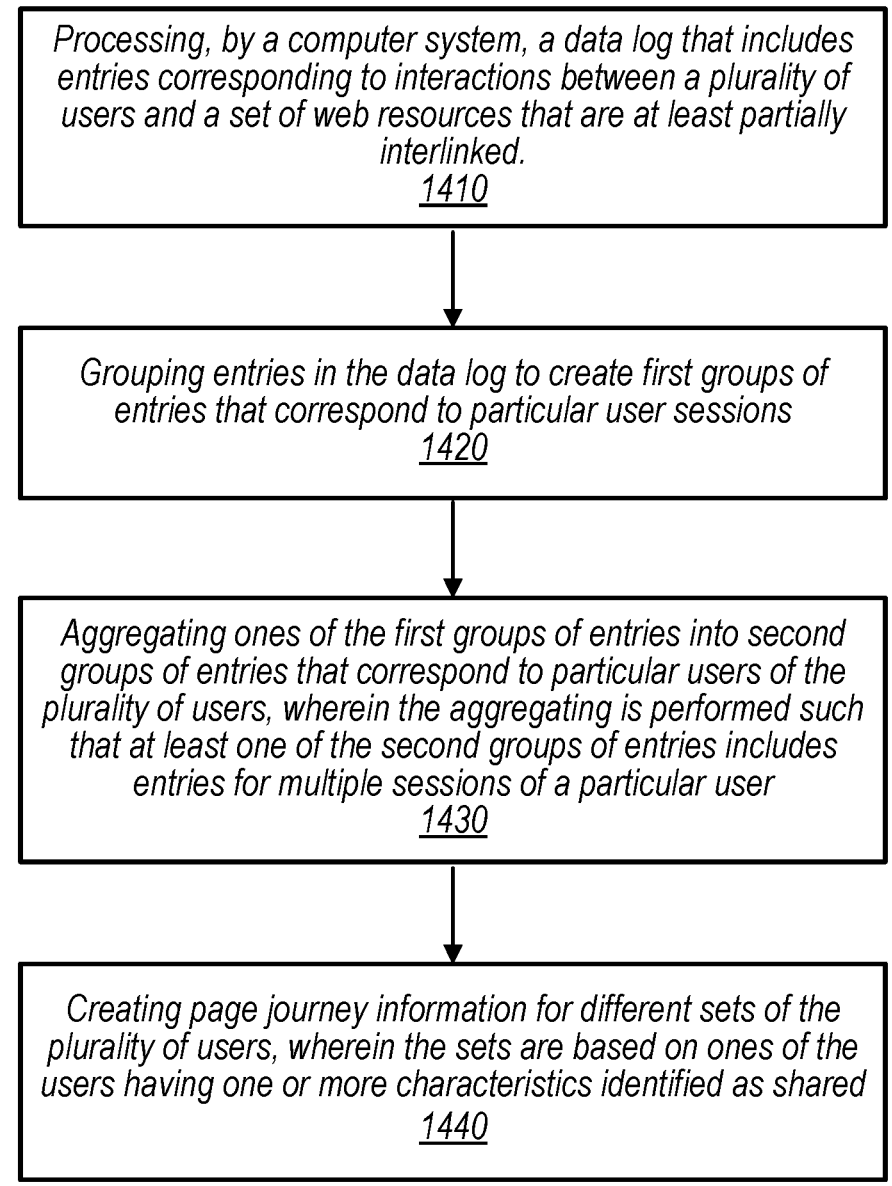
FIG. 14 is a flow diagram illustrating a method for analyzing a data log, according to some embodiments.

FIG. 14 is a flow diagram illustrating a method for analyzing a data log, according to some embodiments. The illustrated method includes aggregating page journey information according to shared user characteristics. The method shown in FIG. 14 may be used in conjunction with any of the computer systems, devices, modules, elements, or components disclosed herein, among other devices. In various embodiments, some of the method elements shown may be performed concurrently, in a different order than shown, or may be omitted. Additional method elements may also be performed as desired.

At 1410 in the illustrated embodiment, a computer system processes a data log that includes entries corresponding to interactions between a plurality of users and a set of web resources that are at least partially interlinked. The illustrated embodiment of 1410 is similar to 910, 1110, or 1410; details may be found in the previous discussions related to those embodiments.

At 1420 in the illustrated embodiment, entries in the data log are grouped to create first groups of entries that correspond to particular user sessions. The grouping may be done using fingerprint values, attribute-value pairs, information include in the data log, extra information not included in the data log, or any of various other methods for identifying user sessions. Grouping may include aggregating entries or indicating entries that belong to a particular group, etc.

At 1430 in the illustrated embodiment, ones of the first groups of entries are aggregated into second groups of entries that correspond to particular users of the plurality of users, wherein the aggregating is performed such that at least one of the second groups of entries includes entries for multiple sessions of a particular user. In some embodiments, a particular user may interact with web resources more than one time, which may results in a data log including entries corresponding to multiple sessions for that particular user. In the illustrated embodiment, multiple sessions corresponding to that particular user may be aggregated. In some embodiments, not all particular users may correspond to more than one session.

At 1440 in the illustrated embodiment, page journey information is created for different sets of the plurality of users, wherein the sets are based on ones of the users having one or more characteristics identified as shared. In some embodiments, characteristics of the users identified at 1430 may be determined by analyzing the data log. In some embodiments, characteristics of the users may be determined by comparing to another source of information. Non-limiting examples of characteristics include income level, age range, or gender. In some embodiments, page journey information is created according to similar methods as previously described, including but not limited to identifying page states, page paths, page journeys, aggregating page journeys, or other processes.

As an example, characteristics shared by users of the second groups of entries may be determined based on a common set of page states. In some embodiments, the identified page states of each user may indicate frequently visited page states of the user, topics which the user is interested in, items the user purchases, or other characteristics. In some embodiments, identified characteristics may be used to further group the second groups of entries into third groups corresponding to users having shared characteristics, and the third groups may be used to create page journey information for different sets of the plurality of users.

In some embodiments, identifying characteristics shared by users is based on information from a second data log, and wherein the second data log includes information corresponding to user identity and user characteristics. This identifying may proceed similarly to or together with the identifying as described earlier, or may be performed without accompaniment.

In some embodiments, identifying characteristics shared by users is based on attributes of page states associated with the user sessions corresponding to the particular users. For example, some attributes may indicate user preferences, which may correspond to user characteristics. In some embodiments, combination of attributes, attribute-value pairs, combinations of attribute-value pairs, etc. may be used to identify characteristics.

EXAMPLE EMBODIMENTS

As an example, consider a website that is concerned primarily with the sale of shoes. The website may include a number of different types of shoes for sale, along with sections dedicated to placing orders for the shoes, engaging with customer service, or recommending shoes to acquaintances. The web site may be accessible through several different applications, including a desktop browser based application, a mobile application, or an application configured for a kiosk.

In some embodiments, an application may be included with the web resources to generate a unique identifier for a user, which may be a fingerprint. This identifier may be an attribute with a unique value that is generated based on user information, random numbers, web cookies, etc. In some embodiments, the fingerprint may be unique to a single session of a user, multiple sessions, or the fingerprint may correspond to all of the user's actions. In some embodiments, the identifier may not be completely unique, (e.g. there may be a small possibility of a repeated identifier) or the identifier may be reused after some time period.

In this embodiment, a user accesses the desktop based application and uses a search facility to locate a pair of shoes of interest. The user may click on several different color options for a particular style of shoe and then select another style of shoe to view. After deciding to purchase a pair of shoes, the user may enter the shoe into the shopping cart, proceed to checkout, enter checkout information, and then purchase the shoes.

Each interaction of the user with the website may generate information about the actions of the user, for example the links of the website clicked by the user, the amount of time spent viewing a page, the text or graphical resources requested by the user, or other information required for the functioning of the website. In this embodiment, this information, which may be a clickstream, is recorded in a data log by the server of the web site. Multiple users may perform the same, similar, or unrelated actions on the website, at the same time or at different times, and the resulting data may be added to a clickstream data log.

In some embodiments, the application interacting with the user may insert a fingerprint into entries in the data log, where the fingerprint corresponds to details about the user, the user's system for accessing the website, etc. In other embodiments, there may be no fingerprint, and processing the data log may include analyzing attributes and attribute values of the data log to determine a set of attributes that may identify a user during a session.

In this embodiment, the shoe-selling website may be interested in analyzing the clickstream data to determine which parts of the website may be improved. The clickstream data log may be too large to be manually analyzed, or the entries may not be intelligible to a human reader. The techniques of this disclosure may be used to facilitate the analysis for this user.

The data log may be processed to determine set of attributes that commonly occur. Attributes with occur according to a threshold may be determined to correspond to the user, while attributes which occur according to another threshold may be determined to correspond to page states, in this embodiment. Based on the frequency of occurrence of attributes and associated values and the thresholds, page states may be identified. For example, page states may include a shopping cart page state, a checkout page state, a page state for a specific type of shoe, or other page states.

In this embodiment, page states that have been identified as belonging to a session of a user may be analyzed to determine the order in which the user viewed these states. The determination may be performed based on attributes which indicate which page states precede or follow a page state, based on the time attributes were accessed or logged, or based on other information in the data log. In this embodiment, the page path includes viewing two different styles of shoes, viewing the shopping cart, and viewing the checkout page. In this embodiment, the sets of page states, or page paths, may be determined for multiple users.

In some embodiments, the purpose of page states may not be known. For example, it may not be obviously indicated which page state is a shopping cart. In this embodiment, a text analyzer may analyze the text of the attributes and values associated with each page state that was identified, and based on comparing to a test set, assign a semantic label to page states. For example, the attributes may be analyzed and the text "shopping cart" may be found to commonly be associated with a specific page state. The semantic label "Shopping Cart" may then be applied to that page state. These semantic labels allow a maintainer of a website to associate meaning with a particular page state.

Page paths from multiple users may be aggregated, in this embodiment. Common sequences of page states, such as viewing first the shopping cart and then the checkout page, may be identified algorithmically. Identified page paths may be selected according to one or more criteria and aggregated. For example, if a threshold level of confidence value for page paths is set to 70% and it is determined that 76% of users view a shopping cart and then the checkout page, the sequences including viewing a shopping cart and then the checkout page may be aggregated.

In this embodiment, the owners of the website may view the aggregated page journeys to determine if improvements may be made to the website. For example, it may be determined that users spend a very short amount of time viewing the shopping cart before proceeding to the checkout page. The website owner, based on this information, may decide to add a button to the shoe description page to proceed directly to the checkout page without first viewing the shopping cart, thus increasing the number of sales of shoes.

In this example, the owners of the website may make a change to the website, for example, adding a button to proceed directly to the checkout page. Additional clickstream data logs may be collected following this change. The new data logs may be analyzed in the same way to generate additional aggregated page journeys. The page journeys may then be compared to determine the effect of the changes. For example, it may be determined that adding the direct-to-checkout button increased the percentage of users who successfully completed a purchase.

In some embodiments, specific users may be identified from the clickstream log. The fingerprint identifier, discussed previously, may be used to identify specific user sessions. Based on the user sessions, attributes which commonly occur between sessions may be identified, in some embodiments. The identified attributes may be aggregated, analyzed, or used to identify specific users.

In some embodiments, page journeys may be grouped based on characteristics of the users. Specific users, identified as discussed above, may be associated with certain characteristics, for example favorite color of shoe. In this example, the website may identify specific users, and based on the page state history of the specific user, may aggregate page journeys in groups. For example, the page journeys of users who view page states including blue suede shoes may be aggregated in one group, and the page journeys of users who view page states including ruby slippers may be aggregated in another group.

In some embodiments, the page journey information aggregated based on user characteristics may be used to provide further insights or alter the web resources accordingly. For example, groups of users with the characteristic of looking at blue shoes may be shown more advertisements for blue shoes. As another example, groups of users that have been identified as male and located on the east coast may be presented with yellow shoes, based on demographic information that east coast males may prefer yellow shoes.

In this example, a specific case of a website selling shoes was discussed. The techniques of this disclosure may also be used for other forms of websites, web applications, or sources of user interaction data. The specific format of the data log may not be known, but the analysis may still be performed to return desired results.

Figure 15:
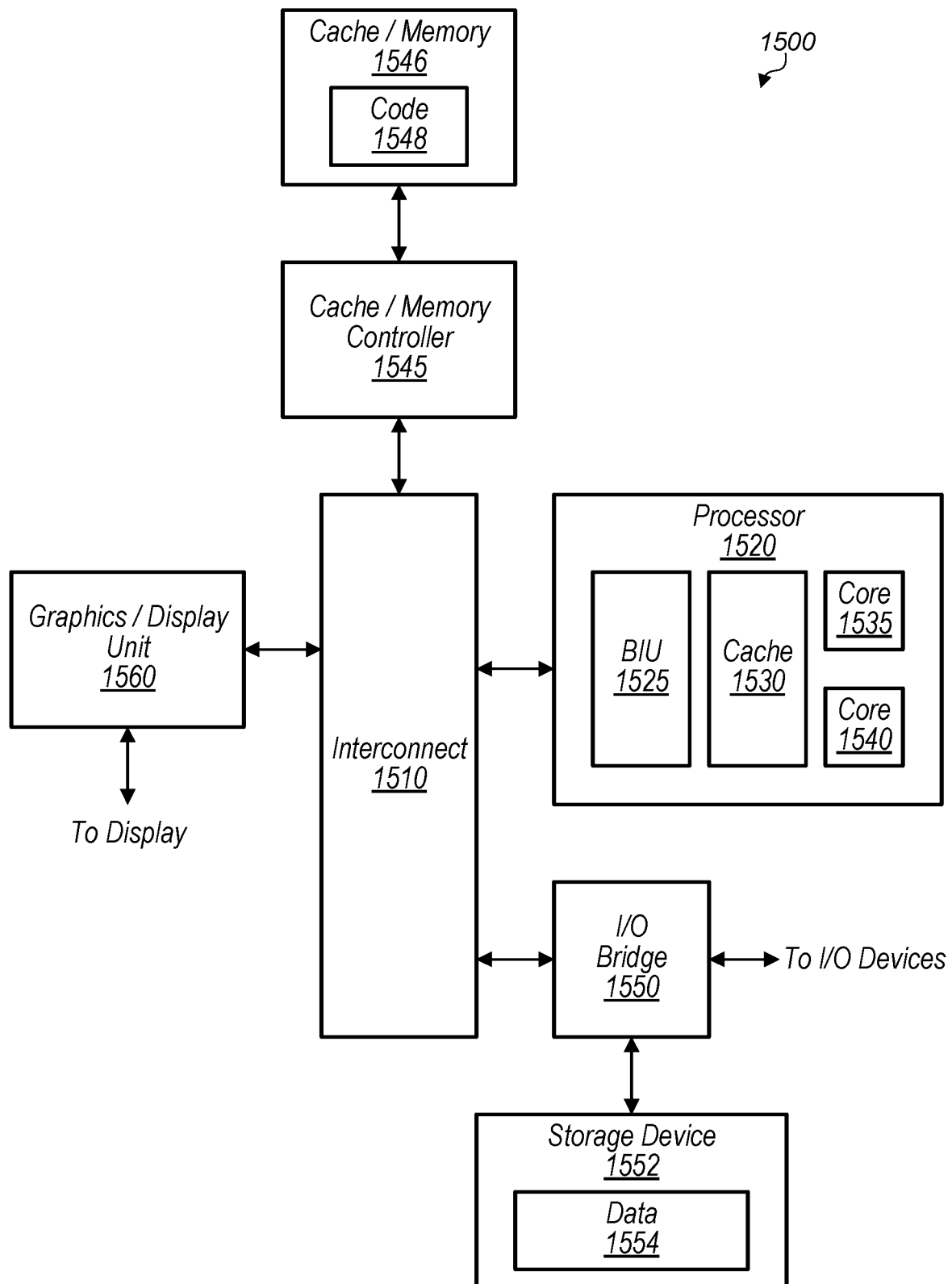
FIG. 15 is a diagram illustrating a computing device, according to some embodiments.

Referring now to FIG. 15, a block diagram illustrating an embodiment of a device 1500 is shown. The illustrated processing elements may be used to implement all or a portion of system 100, in some embodiments. In some embodiments, elements of device 1500 may be included within a system on a chip. In the illustrated embodiment, device 1500 includes interconnect 1510, processor 1520, input/output (I/O) bridge 1550, storage device 1552, data 1554, cache/memory controller 1545, cache/memory 1546, code 1548, and graphics/display unit 1560.

Interconnect 1510 may include various interconnects, buses, MUX's, controllers, etc., and may be configured to facilitate communication between various elements of device 1500. In some embodiments, portions of interconnect 1510 may be configured to implement various different communication protocols. In other embodiments, interconnect 1510 may implement a single communication protocol and elements coupled to interconnect 1510 may convert from the single communication protocol to other communication protocols internally.

In the illustrated embodiment, processor 1520 includes bus interface unit (BIU) 1525, cache 1530, and cores 1535 and 1540. In various embodiments, processor 1520 may include various numbers of processors, processor cores and/or caches. For example, processor 1520 may include 1, 2, or 4 processor cores, or any other suitable number. In one embodiment, cache 1530 is a set associative L2 cache. In some embodiments, cores 1535 and/or 1540 may include internal instruction and/or data caches. In some embodiments, a coherency unit (not shown) in interconnect 1510, cache 1530, or elsewhere in device 1500 may be configured to maintain coherency between various caches of device 1500. BIU 1525 may be configured to manage communication between processor 1520 and other elements of device 1500. Processor cores such as cores 1535 and 1540 may be configured to execute instructions of a particular instruction set architecture (ISA) which may include operating system instructions and user application instructions.

Cache/memory controller 1545 may be configured to manage transfer of data between interconnect 1510 and one or more caches and/or memories, including cache/memory 1546. For example, cache/memory controller 1545 may be coupled to an L3 cache, which may in turn be coupled to a system memory. In other embodiments, cache/memory controller 1545 may be directly coupled to a memory. In some embodiments, cache/memory controller 1545 may include one or more internal caches.

In the illustrated embodiment, cache/memory 1546 contains code 1548. In some embodiments, code 1548 may be used to configure the computing system 1500. In other embodiments, code 1548 may include instructions for processor 1520 to execute, such as instructions relating to the control of any of the systems or devices discussed above, or code 1548 may include information directing the usage of I/O Bridge 1550. Code 1548 may include other information not described here, including but not limited to data, configurations for other components of computing system 1500, or instructions to be executed by computing system 1500.

As used herein, the term "coupled to" may indicate one or more connections between elements, and a coupling may include intervening elements. For example, in FIG. 15, graphics unit 1560 may be described as "coupled to" a memory through interconnect 1510 and cache/memory controller 1545. In contrast, in the illustrated embodiment of FIG. 15, graphics unit 1560 is "directly coupled" to interconnect 1510 because there are no intervening elements.

Graphics/display unit 1560 may include one or more processors and/or one or more graphics processing units (GPU's). Graphics/display unit 1560 may receive graphics-oriented instructions, such as OPENGL® or DIRECT3D® instructions, for example. Graphics/display unit 1560 may execute specialized GPU instructions or perform other operations based on the received graphics-oriented instructions. Graphics/display unit 1560 may generally be configured to process large blocks of data in parallel and may build images in a frame buffer for output to a display. Graphics/display unit 1560 may include transform, lighting, triangle, and/or rendering engines in one or more graphics processing pipelines. Graphics/display unit 1560 may output pixel information for display images.

Graphics/display unit 1560 may be configured to read data from a frame buffer and provide a stream of pixel values for display. Graphics/display unit 1560 may be configured as a display pipeline in some embodiments. Additionally, Graphics/display unit 1560 may be configured to blend multiple frames to produce an output frame. Further, Graphics/display unit 1560 may include one or more interfaces (e.g., MIPI® or embedded display port (eDP)) for coupling to a user display (e.g., a touchscreen or an external display).

I/O bridge 1550 may include various elements configured to implement: universal serial bus (USB) communications, security, audio, and/or low-power always-on functionality, for example. I/O bridge 1550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1500 via I/O bridge 1550. In the illustrated embodiment, I/O Bridge 1550 is coupled to storage device 1552.

In some embodiments, storage device 1552 may be a hard disk drive or solid state drive. Storage device 1552 may be a tape drive, magnetic drive, removable media drive, etc. in some embodiments. In the illustrated embodiment, storage device 1552 includes data 1554.

Data 1554 may include clickstream data, user information, a data log that includes entries corresponding to interactions between a plurality of users and a set of web resources that are at least partially interlinked, page journey information, etc.

In some embodiments, any of various operations discussed herein may be performed by executing program instructions stored on a non-transitory computer readable medium. Such program instructions may be executed using, for example, device 1500. In these embodiments, the non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    processing, by a computer system, a data log that includes entries corresponding to interactions between a plurality of users and a set of web resources that are at least partially interlinked, wherein the processing includes:
        identifying, using fingerprint values included in the data log, groups of entries, wherein each group of entries corresponds to a particular user session;
        analyzing the groups of entries for common attributes to determine groups that correspond to different sessions of ones of the plurality of users;

based on the analyzing, creating aggregated groups, each corresponding to a particular user, and wherein a particular aggregated group includes entries corresponding to different sessions of a particular one of the plurality of users; and using the aggregated groups to create page journey information for the plurality of users, wherein creating the page journey information includes:

identifying page states accessed during a user session;

identifying page paths through two or more page states; and aggregating at least two identified page paths.

2. The method of claim 1, wherein ones of the fingerprint values are generated by:

determining a set of attributes from entries of the data log that identify a user session; and aggregating the set of attributes to produce fingerprint values usable to perform the identifying.

3. The method of claim 1, wherein the particular aggregated group includes a first entry corresponding to a first transaction of the particular user, and wherein the particular aggregated group includes a second entry corresponding to a second transaction of the particular user.

4. The method of claim 1, wherein the particular aggregated group includes a first entry corresponding to a first device of the particular user, and wherein the particular aggregated group includes a second entry corresponding to a second device of the particular user.

5. The method of claim 1, wherein creating page journey information includes classifying attributes within entries in the data log based on a frequency of occurrence of attribute-value pairs, the attribute-value pairs having an attribute with an associated attribute value.

6. The method of claim 1, wherein determining groups of entries corresponding to different sessions of ones of the plurality of users is based on the groups of entries having more than a threshold number of attributes.

7. The method of claim 1, wherein the set of web resources corresponds to portions of a website, and wherein the data log is a set of clickstream data from a plurality of users that have visited the website.

8. A non-transitory computer-readable storage medium having instructions stored thereon that are executable by a computing system to perform operations comprising:

processing a data log that includes entries corresponding to interactions between a plurality of users and a set of web resources that are at least partially interlinked, wherein the processing includes:

identifying, using fingerprint values included in the data log, groups of entries, wherein each group corresponds to a particular user session;

analyzing the groups of entries for common attributes to determine groups that correspond to different sessions of ones of the plurality of users;

based on the analyzing, creating aggregated groups, each corresponding to a particular user, and wherein a particular aggregated group includes entries corresponding to different sessions of a particular one of the plurality of users; and using the aggregated groups to create page journey information for the plurality of users, wherein creating the page journey information includes:

identifying page states accessed during a user session;

identifying page paths through two or more page states; and aggregating at least two identified page paths.

9. The medium of claim 8, wherein the instructions are further executable to process a second data log, wherein a format of the second data log is different from a format of the data log, and wherein the processing is done without user input specifying the format of the second data log.

10. The medium of claim 8, wherein ones of the fingerprint values are generated by the set of web resources and included in the data log.

11. The medium of claim 10, wherein ones of the fingerprint values include a fingerprint attribute of the set of web resources, wherein a value associated with the fingerprint attribute corresponds to a specific user.

12. The medium of claim 8, wherein ones of the fingerprint values are generated by:

determining a set of attributes from entries of the data log that identify a user session; and aggregating the set of attributes to produce fingerprint values usable to perform the identifying.

13. The medium of claim 12, wherein the determined attributes include at least one of web browser, screen resolution, or geographical location.

14. The medium of claim 8, wherein the particular aggregated group includes a first entry corresponding to a first device of the particular user, and wherein the particular aggregated group includes a second entry corresponding to a second device of the particular user.

15. A method, comprising:

processing, by a computer system, a data log that includes entries corresponding to interactions between a plurality of users and a set of web resources that are at least partially interlinked, wherein the processing includes:

grouping entries in the data log to create first groups of entries that correspond to particular user sessions;

aggregating ones of the first groups of entries into second groups of entries that correspond to particular users of the plurality of users, wherein the aggregating is performed such that at least one of the second groups of entries includes entries for multiple sessions of a particular user; and creating page journey information for different sets of the plurality of users, wherein the sets are based on ones of the users having one or more characteristics identified as shared, wherein the one or more characteristics are identified as shared based on attributes of page states associated with user sessions corresponding to the particular users.

16. The method of claim 15, further comprising:

identifying characteristics shared by users corresponding to different ones of the second groups of entries, wherein the identifying characteristics shared by users is based on a common set of page states;

grouping ones of the second groups of entries into third groups of entries corresponding to users having shared characteristics; and using the third groups to create page journey information for different sets of the plurality of users.

17. The method of claim 15, wherein the one or more characteristics are identified as shared based on information from a second data log, and wherein the second data log includes information corresponding to user identity and user characteristics.

18. The method of claim 15, wherein the one or more characteristics include at least one of income level, age range, or gender.

* * * * *